US012684616B2

(12) United States Patent
Yoshioka et al.

(10) Patent No.: US 12,684,616 B2
(45) Date of Patent: Jul. 14, 2026

(54) TERMINAL AND COMMUNICATION METHOD

(71) Applicant: NTT DOCOMO, INC., Tokyo (JP)

(72) Inventors: Shohei Yoshioka, Tokyo (JP); Naoya Shibaike, Tokyo (JP); Shinya Kumagai, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 280 days.

(21) Appl. No.: 18/685,724

(22) PCT Filed: Sep. 6, 2021

(86) PCT No.: PCT/JP2021/032744
§ 371 (c)(1),
(2) Date: Feb. 22, 2024

(87) PCT Pub. No.: WO2023/032230
PCT Pub. Date: Mar. 9, 2023

(65) Prior Publication Data
US 2024/0357645 A1     Oct. 24, 2024

(51) Int. Cl.
*H04W 74/0808*     (2024.01)
*H04W 16/14*     (2009.01)
(52) U.S. Cl.
CPC ........ *H04W 74/0808* (2013.01); *H04W 16/14* (2013.01)
(58) Field of Classification Search
None
See application file for complete search history.

(56) References Cited

U.S. PATENT DOCUMENTS

| | | | |
|---|---|---|---|
| 2017/0325215 A1 | 11/2017 | Takeda et al. | |
| 2018/0220462 A1 | 8/2018 | Kusashima et al. | |
| 2020/0280971 A1 | 9/2020 | Moon et al. | |
| 2021/0092783 A1* | 3/2021 | Sun | H04W 74/0875 |
| 2021/0195649 A1* | 6/2021 | Xue | H04W 72/20 |

(Continued)

FOREIGN PATENT DOCUMENTS

| | | | |
|---|---|---|---|
| EP | 3337272 A1 | 6/2018 | |
| WO | 2016/072214 A1 | 5/2016 | |

(Continued)

OTHER PUBLICATIONS

Notice of Reasons for Refusal issued in Japanese Patent Application No. 2023-545004, mailed May 20, 2025 (6 pages).

(Continued)

*Primary Examiner* — Brian S Roberts
(74) *Attorney, Agent, or Firm* — Osha Bergman Watanabe & Burton LLP

(57)     ABSTRACT

A terminal includes: a reception unit configured to receive a control channel and a shared channel in an unlicensed band from another terminal; a control unit configured to perform an LBT (Listen before talk) for a period in a symbol immediately before a resource of a feedback channel corresponding to the shared channel or in a first symbol of the resource of the feedback channel; and a transmission unit configured to transmit a feedback to the another terminal in the resource of the feedback channel in a case where a power exceeding a threshold value is not detected in the LBT.

3 Claims, 17 Drawing Sheets

(56) References Cited

U.S. PATENT DOCUMENTS

| | | | |
|---|---|---|---|
| 2022/0061095 A1* | 2/2022 | Xue | H04W 80/02 |
| 2022/0201748 A1 | 6/2022 | Harada et al. | |
| 2022/0338175 A1* | 10/2022 | Liu | H04W 76/14 |
| 2022/0417991 A1* | 12/2022 | Farag | H04W 74/0808 |
| 2023/0049707 A1 | 2/2023 | Harada et al. | |

FOREIGN PATENT DOCUMENTS

| | | |
|---|---|---|
| WO | 2017/022778 A1 | 2/2017 |
| WO | 2017/026463 A1 | 2/2017 |
| WO | 2020217513 A1 | 10/2020 |
| WO | 2021161483 A1 | 8/2021 |

OTHER PUBLICATIONS

Office Action issued in counterpart Japanese Patent Application No. 2023-545004 mailed on Sep. 24, 2025 (5 pages).

Office Action issued in counterpart Japanese Patent Application No. 2023-545004 mailed on Dec. 9, 2025 (4 pages).
3GPP TS 38.211 V16.6.0; "3rd Generation Partnership Project; Technical Specification Group Radio Access Network; NR; Physical channels and modulation (Release 16)"; Jun. 2021 (134 pages).
3GPP TR 22.886 V15.1.0; "3rd Generation Partnership Project; Technical Specification Group Services and System Aspects; Study on enhancement of 3GPP Support for 5G V2X Services(Release 15)"; Mar. 2017 (58 pages).
3GPP TS 38.306 V16.5.0; "3rd Generation Partnership Project; Technical Specification Group Radio Access Network; NR; User Equipment (UE) radio access capabilities (Release 16)"; Jun. 2021 (153 pages).
International Search Report issued in corresponding International Application No. PCT/JP2021/032744, mailed on Apr. 12, 2022 (5 pages).
Written Opinion issued in corresponding International Application No. PCT/JP2021/032744, mailed on Apr. 12, 2022 (4 pages).
Xiaomi Communications; "On Procedures for 5G V2x communications"; 3GPP TSG RAN WG1 #99, R1-1913077; Reno, USA; Nov. 18-22, 2019 (5 pages).

* cited by examiner

FIG.4

| DCI format 3_0 |
| --- |
| Resource pool index |
| Time gap (PDCCH to PSCCH/PSSCH) |
| Lowest sub-ch. index of the initial TX |
| Freq. resource |
| Time resource |
| HARQ process ID |
| New data indicator |
| PSFCH-to-HARQ feedback timing indicator |
| PUCCH resource indicator |
| Counter SAI |
| Configuration index (for CG) |

INFORMATION INDICATING SCHEDULED RESOURCE

CONTROL RELATED TO INITIAL TRANSMISSION/ RETRANSMISSION

INFORMATION RELATED TO FEEDBACK

FIG.5

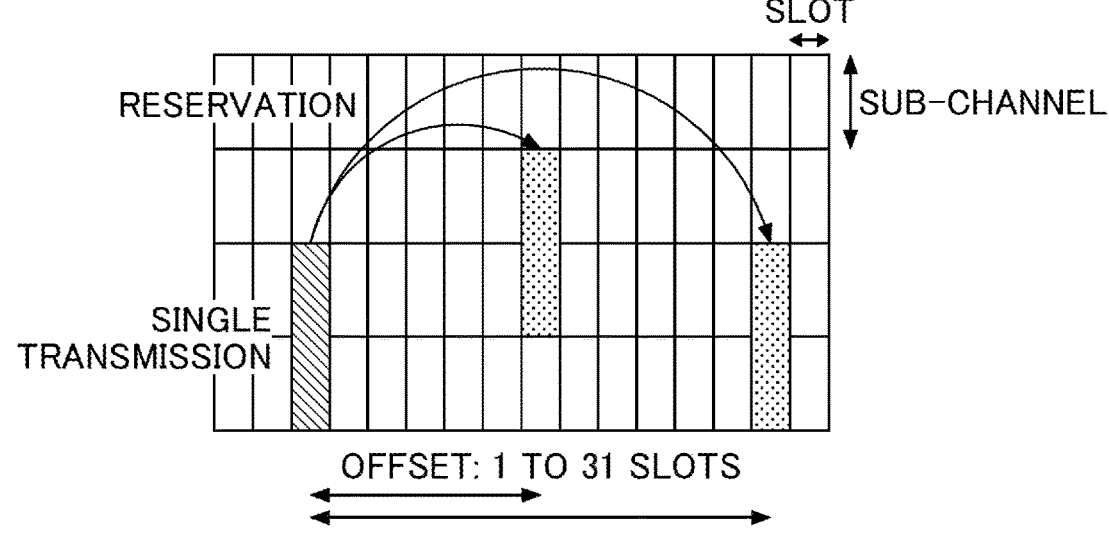

SLOT

SUB-CHANNEL

RESERVATION

SINGLE TRANSMISSION

OFFSET: 1 TO 31 SLOTS

TIME

RESERVATION

PERIOD: 0, 1:99, 100, 200, 300, 400, 500, 600, 700, 800, 900, 1000 ms

SINGLE TRANSMISSION

SUB-CHANNEL
- SCHEDULING UNIT OF
  FREQUENCY DOMAIN
- SIZES TO BE CONFIGURED ARE
  {10, 12, 15, 20, 25, 50, 75, 100} PRBs

TRANSMISSION ACCORDING TO INDICATION FROM NW

TERMINAL AND COMMUNICATION METHOD

FIELD OF THE INVENTION

The present invention relates to a terminal and a communication method in a wireless communication system.

BACKGROUND OF THE INVENTION

In LTE (Long Term Evolution) and LTE successor systems (e.g., LTE-A (LTE Advanced), NR (New Radio) (also referred to as 5G)), a D2D (Device to Device) technology in which terminals communicate directly with each other without using a base station is being discussed (e.g., Non-Patent Document 1).

The D2D reduces traffic between the terminals and the base stations and enables communication between the terminals even when the base stations are unable to communicate during a disaster, etc. Although the 3GPP (3rd Generation Partnership Project) refers to D2D as a "sidelink," the more generic term D2D is used herein. However, in the description of embodiments described below, the sidelink is also used as needed.

The D2D communication is broadly classified into: D2D discovery for discovering other terminals capable of communication; and D2D communication (D2D direct communication, direct communication between terminals, etc.) for direct communication between terminals. Hereinafter, when D2D communication and D2D discovery are not specifically distinguished, it is simply called D2D. A signal sent and received by D2D is called a D2D signal. Various use cases of V2X (Vehicle to Everything) services in NR have been discussed (e.g., Non-Patent Document 2).

In addition, in NR release 17, using a higher frequency band than a conventional release (e.g., Non-Patent Document 3) is being discussed. For example, applicable numerologies including subcarrier spacings, channel bandwidths, etc., physical layer design, and possible failures in actual wireless communication in the 52.6 GHz to 71 GHz frequency band have been discussed.

CITATION LIST

Non-Patent Document

Non-Patent Document 1: 3GPP TS 38.211 V16.6.0 (2021 June)
Non-Patent Document 2: 3GPP TR 22.886 V15.1.0 (2017 March)
Non-Patent Document 3: 3GPP TS 38.306 V16.5.0 (2021 June)

SUMMARY OF THE INVENTION

Technical Problem

In a newly-operated frequency band in which higher frequencies that are higher than conventional frequencies are used, an unlicensed band is defined. In the unlicensed band, various regulations are specified, and, for example, an LBT (Listen before talk) is to be performed when accessing a channel. In the higher frequency band, in a case of performing a D2D communication, an operation adapted to the regulations in the unlicensed band is required.

The present invention has been made in view of the above points, and an object is to perform a device-to-device direct communication that satisfies the specification in the unlicensed band.

Solution to Problem

According to the disclosed technique, a terminal is provided. The terminal includes: a reception unit configured to receive a control channel and a shared channel in an unlicensed band from another terminal; a control unit configured to perform an LBT (Listen before talk) for a period in a symbol immediately before a resource of a feedback channel corresponding to the shared channel or in a first symbol of the resource of the feedback channel; and a transmission unit configured to transmit a feedback to the another terminal in the resource of the feedback channel in a case where a power exceeding a threshold value is not detected in the LBT.

Advantageous Effects of Invention

According to the disclosed technique, a device-to-device direct communication that satisfies the specification in the unlicensed band can be performed.

BRIEF DESCRIPTION OF THE DRAWINGS

FIG. 4 is a drawing illustrating an example of a DCI format.

FIG. 5 is a drawing illustrating an example (1) of a resource allocation mode 2.

DETAILED DESCRIPTION OF THE PREFERRED EMBODIMENTS

Figure 1:
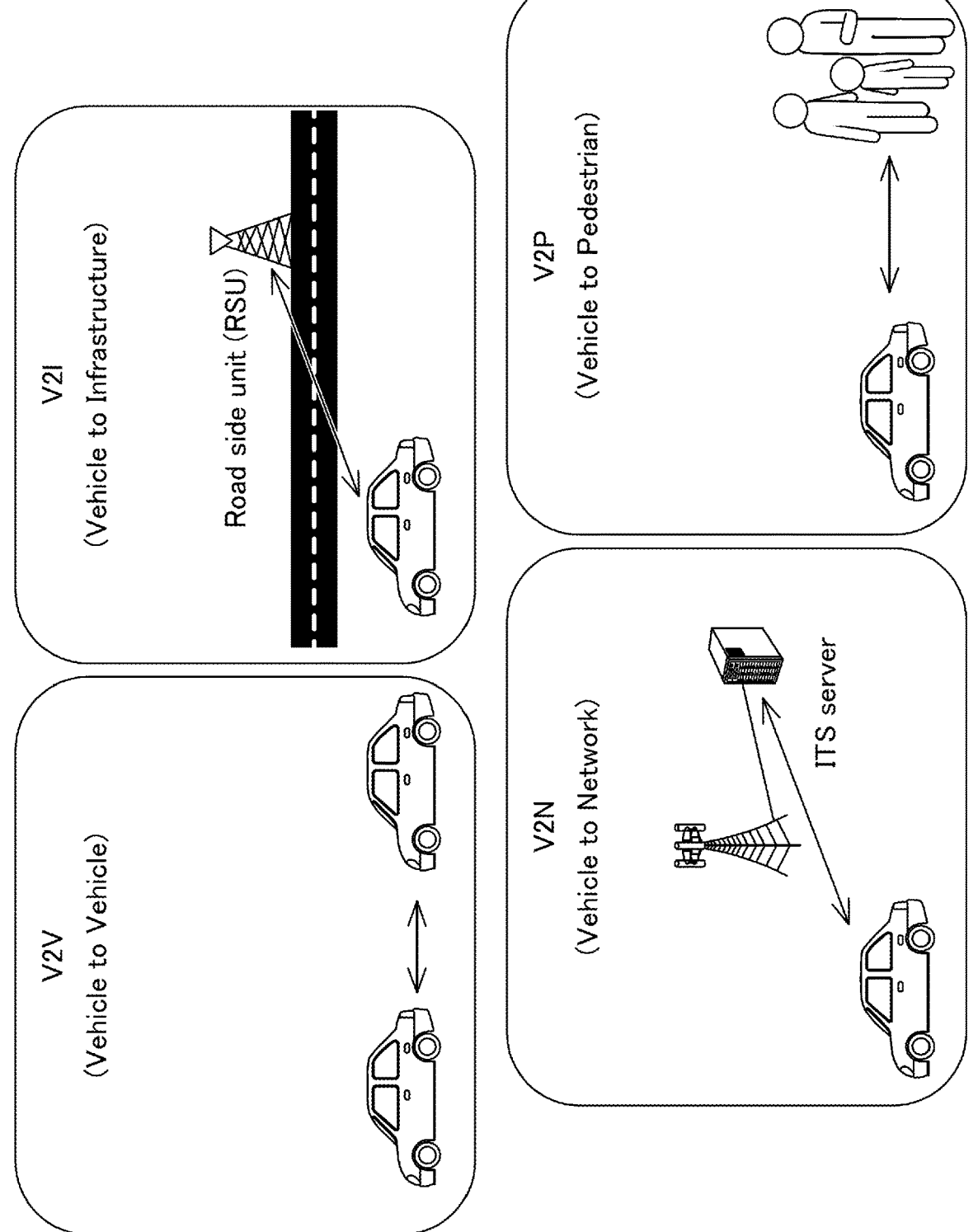
FIG. 1 is a drawing for describing V2X.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, a conventional technique will be used when it is appropriate. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR), or wireless LAN (Local Area Network).

In addition, in an embodiment of the present invention, the duplex method may be a TDD (Time Division Duplex) method, an FDD (Frequency Division Duplex) method, or any other method (e.g., Flexible Duplex, or the like).

Further, in an embodiment of the present invention, the expression, radio (wireless) parameters are "configured (set)" may mean that a predetermined value is pre-configured, or may mean that a radio parameter indicated by the base station 10 or the terminal 20 is configured.

FIG. 1 is a drawing illustrating V2X. In 3GPP, enhancing D2D functions to realize V2X (Vehicle to Everything) or eV2X (enhanced V2x) has been discussed and specifications are being developed. As illustrated in FIG. 1, V2X is a part of ITS (Intelligent Transport Systems) and is a generic name (collective name) for: V2V (Vehicle to Vehicle) referring to a form of communication performed between vehicles; V2I (Vehicle to Infrastructure) referring to a form of communication performed between a vehicle and a road-side unit (RSU) that is installed on roadside; V2N (Vehicle to Network) referring to a form of communication performed between a vehicle and an ITS server; and V2P (Vehicle to Pedestrian) referring to a form of communication performed between a vehicle and a mobile terminal that is held by a pedestrian.

Further, in 3GPP, V2X using LTE/NR's cellular communication and communication between terminals has been discussed. V2X using cellular communication may be referred to as cellular V2X. In NR V2X, discussions have been performed to realize higher system capacity, reduced latency, higher reliability, and QOS (Quality of Service) control.

With respect to LTE V2X or NR V2X, it is assumed that discussions may be not limited to 3GPP specifications in the future. For example, it is assumed to be discussed on: how to secure interoperability; how to reduce cost by implementing higher layers; how to use or how to switch multiple RATs (Radio Access Technologies); how to handle regulations of each country; how to obtain and distribute data of LTE/NR V2X platform; and how to manage and use databases.

In an embodiment of the present invention, a form of embodiment is mainly assumed in which communication apparatuses are mounted on vehicles. However, an embodiment of the present invention is not limited to such a form. For example, communication apparatuses may be terminals held by people, may be apparatuses mounted on drones or aircrafts, or may be base stations, RSUs, relay stations (relay nodes), terminal capable of scheduling, etc.

It should be noted that SL (Sidelink) may be distinguished from UL (Uplink) or DL (Downlink) based on any one of, or any combination of the following 1) through 4). Furthermore, SL may be referred to as a different name.
1) Resource arrangement in the time domain
2) Resource arrangement in the frequency domain
3) Synchronization signal that should be referred to (including SLSS (Sidelink Synchronization Signal))
4) Reference signal that is used for pass loss measurement used for transmission power control Further, with respect to OFDM (Orthogonal Frequency Division Multiplexing) of SL or UL, any of CP-OFDM (Cyclic-Prefix OFDM), DFT-S-OFDM (Discrete Fourier Transform-Spread-OFDM), OFDM without Transform precoding, and OFDM with Transform precoding may be applied.

In LTE SL, with respect to allocating SL resources to terminal 20, Mode 3 and Mode 4 are defined. In Mode 3, transmission resources are dynamically allocated using a DCI (Downlink Control Information) that is transmitted from a base station 10 to a terminal 20. Further, in Mode 3, SPS (Semi Persistent Scheduling) is enabled (available). In Mode 4, the terminal 20 autonomously selects transmission resources from a resource pool.

It should be noted that a slot in an embodiment of the present invention may be read on (replaced with) a symbol, a mini slot, a subframe, a radio frame, or a TTI (Transmission Time Interval). Further, a cell in an embodiment of the present invention may be read on (replaced with) a cell group, a carrier component, a BWP (bandwidth part), a resource pool, a resource, a RAT (Radio Access Technology), a system (including a wireless LAN), etc.

Note that, in an embodiment of the present invention, the terminal 20 is not limited to a V2X terminal, but may be any type of terminal that performs D2D communication. For example, the terminal 20 may be a terminal carried by a user, such as a smart phone, or an IoT (Internet of Things) device, such as a smart meter.

With respect to the 3GPP release 16 or release 17 sidelink, specifications are being developed targeting 1) and 2) below.
1) Environment in the ITS (Intelligent Transport Systems) band in which there are only 3GPP terminals
2) Environment in the FR1 (Frequency range 1) and FR2 licensed band defined in NR in which UL resources can be used for SL Discussions are being performed in which an unlicensed band is newly targeted as the sidelink of 3GPP release 18 and later. For example, an unlicensed band such as the 5 GHz to 7 GHz band, 60 GHz band, or the like.

Figure 2:
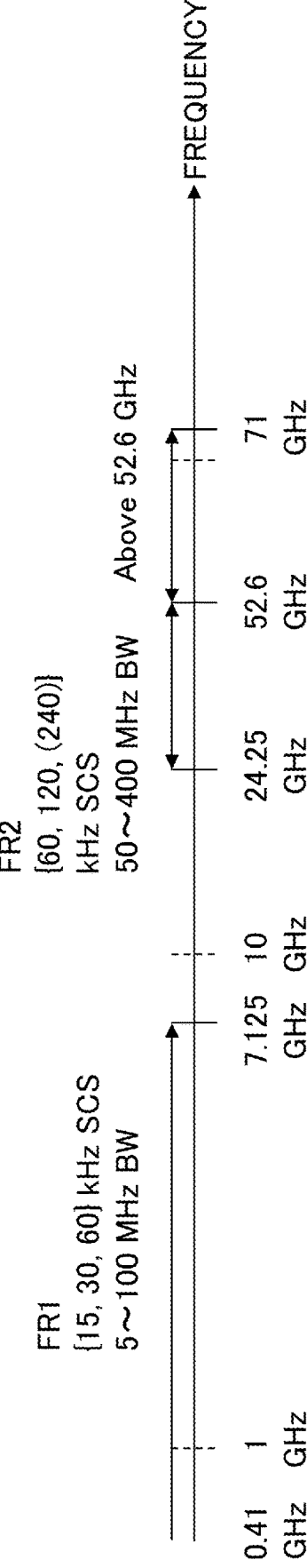
FIG. 2 is a drawing illustrating an example of a frequency range according to an embodiment of the present invention.

FIG. 2 is a drawing illustrating an example of a frequency range in an embodiment of the present invention. In the 3GPP release 17 NR specifications, for example, an operation in a frequency band of 52. 6 GHz or higher is being discussed. Note that, as illustrated in FIG. 2, FR1 in which the current operation is specified is a frequency band from 410 MHz to 7.125 GHz, the SCS (Sub carrier spacing) is 15, 30, or 60 kHz, and the bandwidth is from 5 MHz to 100 MHz. FR2 is a frequency band from 24.25 GHz to 52.6 GHz, the SCS is 60, 120, or 240 kHz, and the bandwidth is from 50 MHz to 400 MHz. For example, the newly operated frequency band may be assumed to be a band from 52.6 GHz to 71 GHz.

For example, a band from 5, 15 GHz to 5.35 GHz, a band from 5.47 GHz to 5.725 GHz, a band that is equal to or higher than 5.925 GHz, or the like is expected as an example of an unlicensed band in the 5 GHz to 7 GHz band.

For example, a band from 59 GHz to 66 GHZ, a band from 57 GHz to 64 GHz or 66 GHz, a band from 59.4 GHz to 62.9 GHZ, or the like is expected as an example of an unlicensed band in the 60 GHz band.

In the unlicensed band, various regulations are specified so as to avoid influence to another system or another device.

For example, in the 5 GHz to 7 GHz band, an LBT (Listen before talk) is to be performed when accessing a channel. The base station 10 or the terminal 20 performs power detection in a predetermined period immediately before transmission, and stops the transmission in a case where the power exceeds a predetermined value, that is, in a case where transmission from another device is detected. In addition, the maximum channel occupancy time (MCOT) is specified. MCOT is a maximum time duration in which transmission continuation is allowed in a case where transmission is started after the LBT, and is 4 ms in Japan, for example. In addition, in a case where the transmission uses a carrier bandwidth, X % or more of the bandwidth must be used as the occupied channel bandwidth (OCB) requirements. For example, in Europe, as much as 80% to 100% of NCB (nominal channel bandwidth) is required to be used. The purpose of the OCB requirements is that the channel access power detection is to be performed correctly. In addition, with respect to the maximum transmission power and the maximum power spectral density, it is specified that the transmission is to be performed with predetermined transmission power or less. For example, in Europe, the maximum transmission power is 23 dBm in the 5150 MHz to 5350 MHz band. In addition, for example, in Europe, the maximum power spectral density is 10 dBm/MHz in the 5150 MHz to 5350 MHz band.

For example, in the 60 GHz band, an LBT is to be performed when accessing a channel. The base station 10 or the terminal 20 performs power detection in a predetermined period immediately before transmission, and stops the transmission in a case where the power exceeds a predetermined value, that is, in a case where transmission from another device is detected. In addition, with respect to the maximum transmission power and the maximum power spectral density, it is specified that the transmission is to be performed with predetermined transmission power or less. In addition, the capability of satisfying the OCB requirements is specified.

In the 3GPP release 16 and release 17 sidelink, two types of resource allocation modes are specified as described below.

1) Resource Allocation Mode 1

Sidelink scheduling is performed by the network. The terminal 20 performs sidelink transmission based on the sidelink grant received from the network.

2) Resource Allocation Mode 2

The terminal 20 autonomously selects a sidelink resource and performs transmission. The terminal 20 performs monitoring of transmission of another terminal 20 in advance, and selects a resource that can be used. The monitoring of transmission of another terminal 20 may be referred to as sensing. Each terminal 20 specifies a future resource in the transmission, and the future resource is referred to when selecting the above-described resource. The specifying of a future resource may be referred to as reservation.

Figure 3:
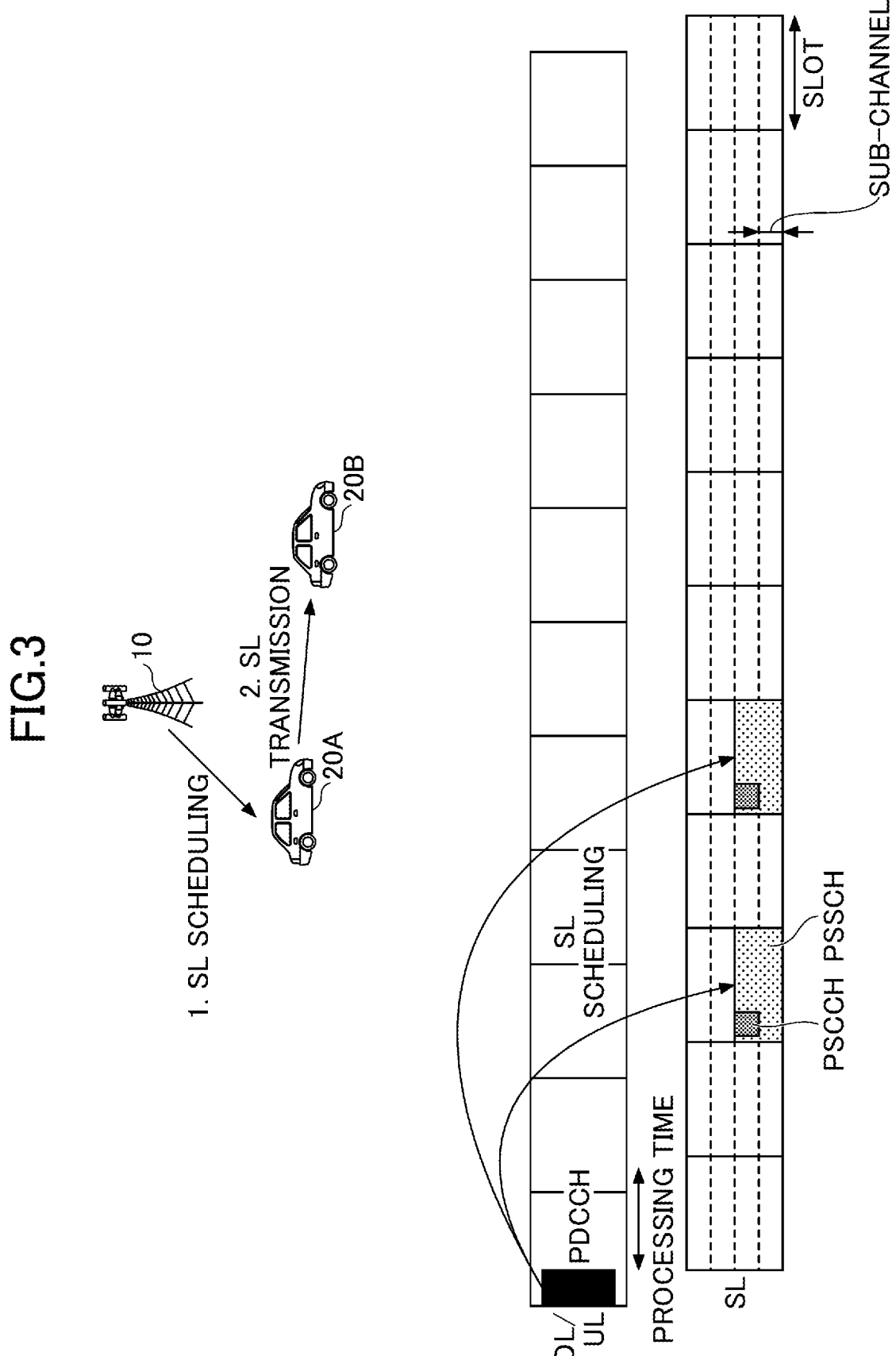
FIG. 3 is a drawing illustrating an example of a resource allocation mode 1.

FIG. 3 is a drawing illustrating an example of the resource allocation mode 1. As illustrated in FIG. 3, in the resource allocation mode 1, an SL transmission resource is allocated to the terminal 20A from the base station 10. That is, as illustrated in FIG. 3, an SL transmission resource (PSCCH/PSCCH) is allocated to the terminal 20A according to a PDCCH (specifically, DCI) received from the base station 10, and the terminal 20A performs SL transmission to the terminal 20B by using the transmission resource.

More specifically, with respect to the SL transmission allocation from the base station 10 to the terminal 20A, there are a dynamic grant (DG), a configured grant (CG) type 1, and a CG type 2. In the resource allocation mode 1, DCI format 3_0 is used for DG and CG type 2. Note that the monitoring occasion of DCI format 3_0 is configured separately from other formats.

FIG. 4 is a drawing illustrating an example of DCI format. As illustrated in FIG. 4, the information indicated by DCI format 3_0 includes: information of resource to a be scheduled: information related to initial transmission/retransmission; and information related to HARQ (Hybrid automatic repeat request) feedback. With respect to the information related to the initial transmission/retransmission, the transmission-side terminal 20A manages association between the HPN (HARQ Process Number) specified by DCI format 3_0 and the HPN in the SCI.

In the resource allocation mode 2, the terminal 20 autonomously selects a resource of a periodic or aperiodic traffic by performing the two steps described below. At this time, periodic or aperiodic resource reservation by another terminal 20 is taken into account.

Step 1) Identify resources to be candidates in the resource selection window

Step 2) Select a resource to be used for transmission or retransmission from the identified resources The above-described step 1 is performed based on the two types of resource reservation. The first type is reservation for transmission or retransmission of aperiodic traffic according to the time resource assignment field. The second type is reservation for transmission or retransmission of periodic traffic according to the resource reservation period field.

FIG. 5 is a drawing illustrating an example (1) of the resource allocation mode 2. As illustrated in FIG. 5, a plurality of resources may be reserved by a single transmission. For example, an offset from the transmission for reservation to the resource to be reserved may be 1 slot to 31 slots.

Figure 6:
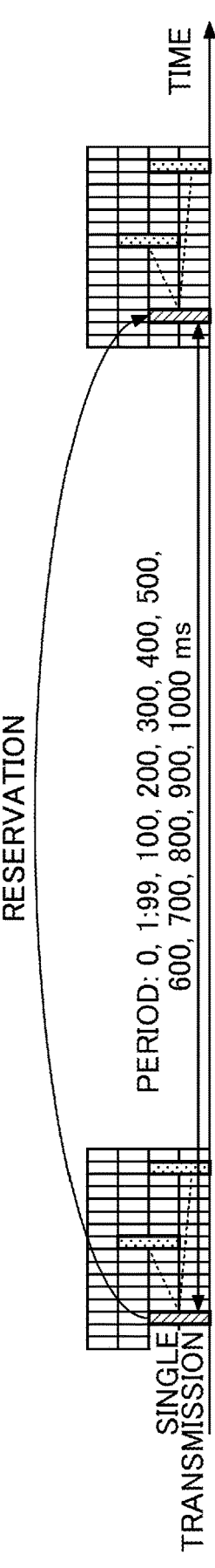
FIG. 6 is a drawing illustrating an example (2) of a resource allocation mode 2.

FIG. 6 is a drawing illustrating an example (2) of the resource allocation mode 2. As illustrated in FIG. 6, resources may be reserved periodically by a single transmission. The period may be, for example: 0 ms: from 1 ms to 99 ms: 100 ms: 200 ms: 300 ms: 400 ms: 500 ms: 600 ms: 700 ms: 800 ms: 900 ms; and 1000 ms.

Here, an operation related to transmission of sidelink in the unlicensed band (hereinafter, also referred to as "SL-U") is required to be specified. For example, an operation satisfying the OCB requirements is required to be specified. For example, an operation in a case of the resource allocation mode 2, that is, in a case of autonomous sidelink resource selection by the terminal 20, is required to be specified as a channel access operation. In addition, for example, an operation in a case of the resource allocation mode 1, that is, in a case of sidelink scheduling by the network, is required to be specified as a channel access operation. In addition, for example, a PSFCH (Physical Sidelink Feedback Channel) transmission operation after the PSSCH (Physical Sidelink Shared Channel) reception, is required to be specified as a channel access operation.

Accordingly, an operation related to sidelink transmission and reception in the unlicensed band may be specified. For example, an operation satisfying the OCB requirements may be specified. For example, an operation in a case of the resource allocation mode 2, that is, in a case of autonomous sidelink resource selection by the terminal 20, may be specified as a channel access operation. In addition, for example, an operation in a case of the resource allocation mode 1, that is, in a case of sidelink scheduling by the network, may be specified as a channel access operation. In addition, a PSFCH transmission operation after the PSSCH reception may be specified as a channel access operation.

Figure 7:
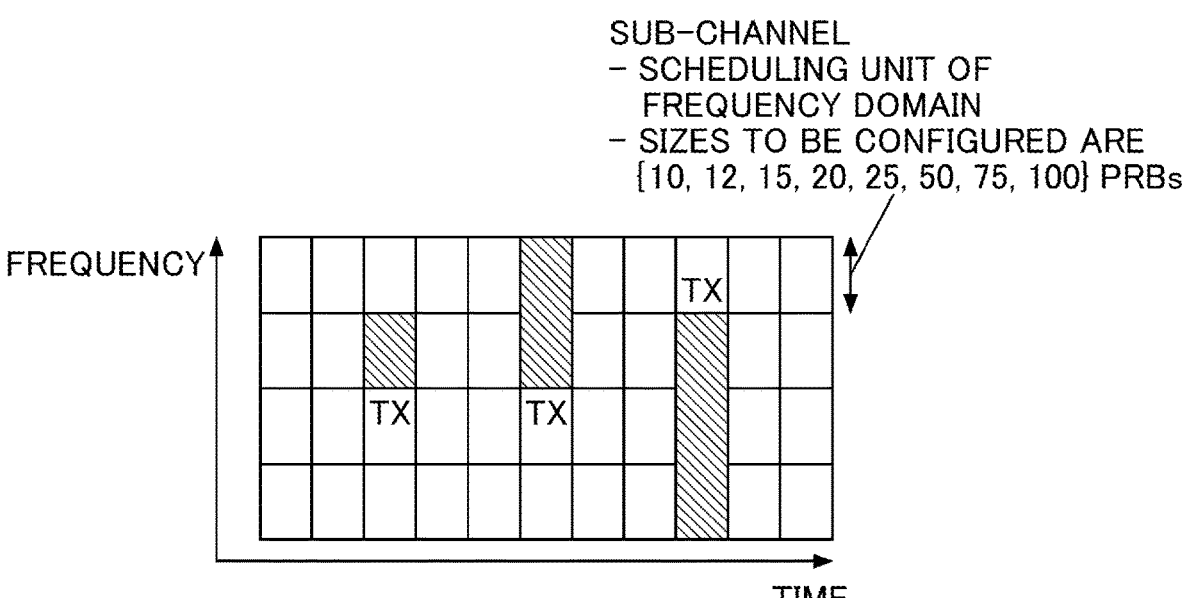
FIG. 7 is a drawing illustrating an example of sidelink transmission.

FIG. 7 is a drawing illustrating an example of sidelink transmission. As illustrated in FIG. 7, in the conventional sidelink, a unit of transmission (hereinafter, also referred to as "TX") in the frequency domain is a sub-channel. A sub-channel is configured using the number of PRBs (Physical Resource Blocks), and may include, for example, 10, 12, 15, 20, 25, 50, 75, or 100 PRBs.

Figure 8:
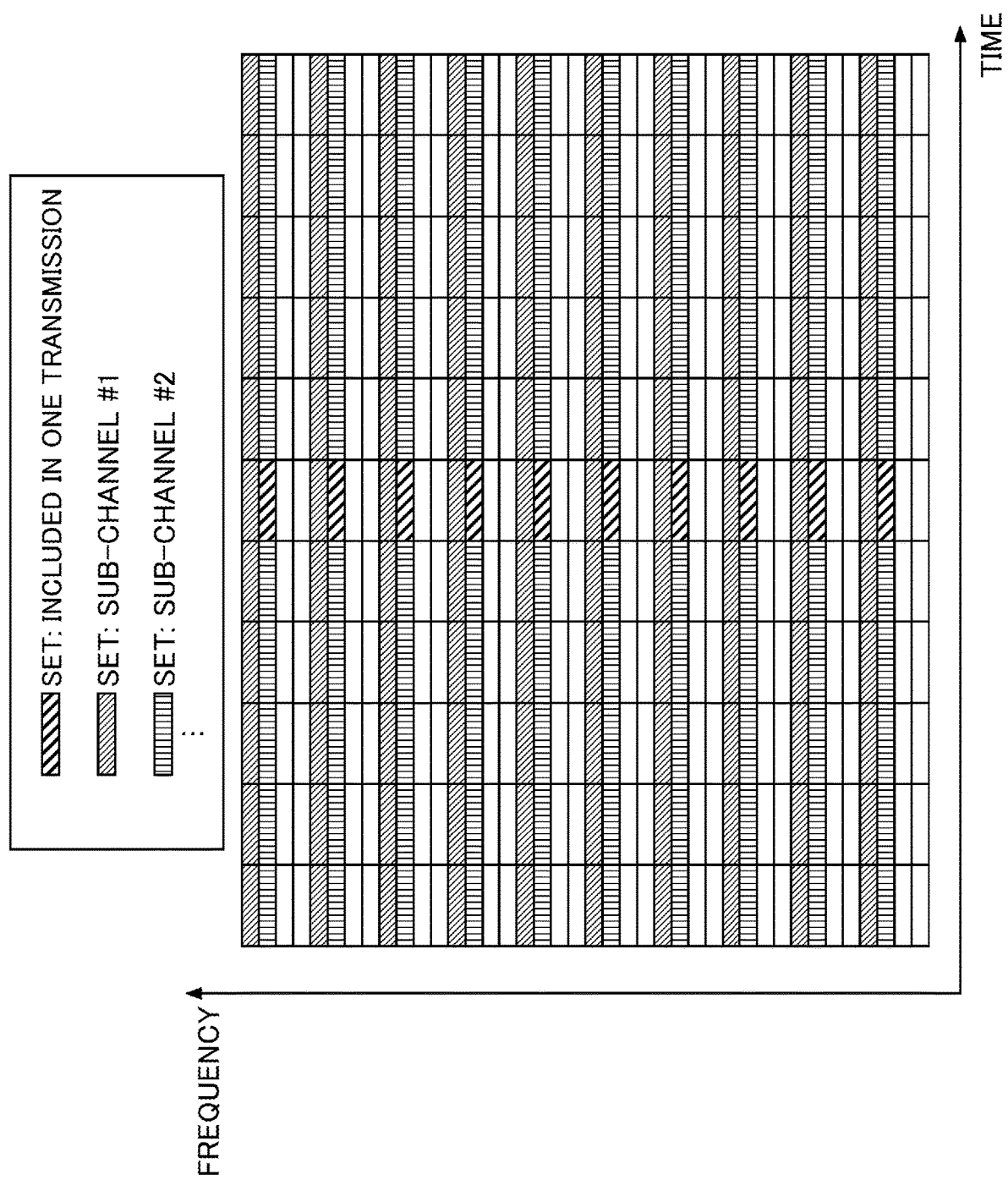
FIG. 8 is a drawing illustrating an example (1) of sidelink transmission in an embodiment of the present invention.

FIG. 8 is a drawing illustrating an example (1) of sidelink transmission in an embodiment of the present invention. As illustrated in FIG. 8, in order to satisfy the OCB requirements, interlacing may be applied to sub-channels in the resource pool in the unlicensed band. An example illustrated in FIG. 8 is an example in which the interlacing is applied to sub-channels from sub-channel #1 to sub-channel #4. Each PSCCH/PSSCH transmission may be performed by using the interlaced sub-channels. The interlacing may be performed by using a unit including a PRB, may be performed by using a unit including a plurality of PRBs, or may be performed by using a unit including a plurality of sub-carriers.

The interlace structure may be implemented by mapping from the VRB (Virtual Resource Block) to the PRB (Physical Resource Block). An upper limit of the number of sub-channels may be configured, or an upper limit of the interlace spacing may be configured. Different values may be configured for each SCS, and, for example, an upper limit of the interlace spacing may be 10 PRBs in a case where the SCS is 15 kHz, or may be 5 PRBs in a case where the SCS is 30 KHz.

The sidelink structure of reservation or transmission using a unit of a sub-channel can be maintained while satisfying the OCB requirements by applying the interlacing to sub-channels as described above.

Figure 9:
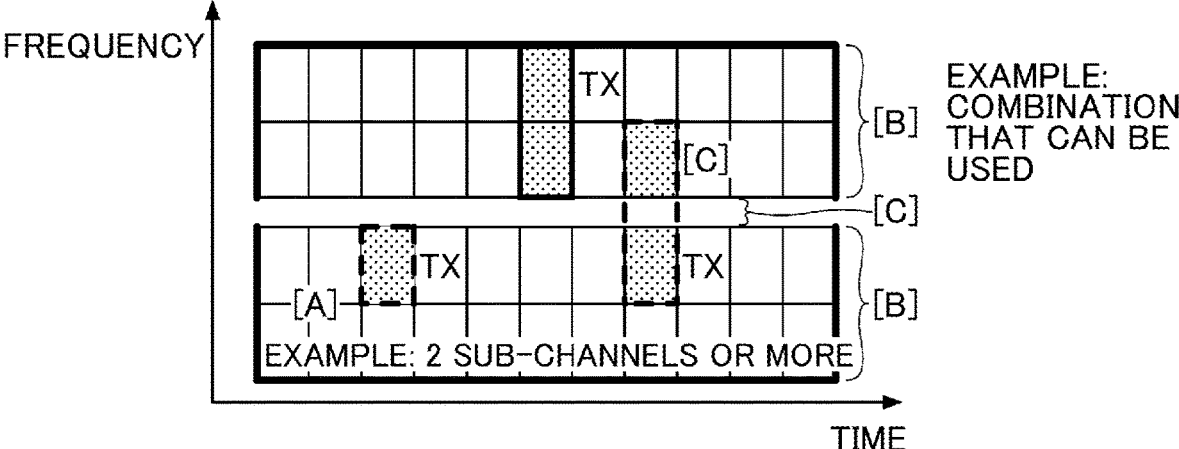
FIG. 9 is a drawing illustrating an example (2) of sidelink transmission in an embodiment of the present invention.

The minimum number of sub-channels to be used may be defined in the unlicensed band, and sub-channels equal to or greater than this number of sub-channels may be used in each transmission. FIG. 9 is a drawing illustrating an example (2) of sidelink transmission in an embodiment of the present invention. FIG. 9 is an example in which the minimum number of sub-channels to be used is 2. The [A] in FIG. 9 indicates an example in which transmission using one sub-channel is not allowed, that is, in which transmission using two or more sub-channels is allowed. The [B] in FIG. 9 indicates a combination of sub-channels that can be used, and the minimum number of sub-channels to be used may be a value that is satisfied by each combination. Furthermore, with respect to a transmission, a combination of sub-channels that can be used may be defined, or a combination of sub-channels that cannot be used may be defined, additionally or alternatively.

Furthermore, as illustrated by [C] in FIG. 9, one or more frequency resources (PRBs) that are not used may be defined between sub-channels, additionally or alternatively. The resource pool may be defined as frequency resources that are not contiguous. The [C] in FIG. 9 indicates an example in which transmission stretching across one or more frequency resources that are not used between sub-channels is not allowed. The resource allocation may be performed in a manner in which transmission does not stretch across one or more frequency resources that are not used between sub-channels.

It is to be noted the carrier bandwidth related to the regulations (that is, the LBT bandwidth) may be different from the carrier bandwidth specified in the 3GPP technical specification. The one or more frequency resources that are not used between sub-channels as illustrated by [C] in FIG. 9 may be used as a guard band between carrier bands in the regulations.

A wide band can be treated as one resource pool while satisfying the OCB requirements by defining the resource pool as described above, and thus, the resource utilization efficiency can be improved.

Figure 10:
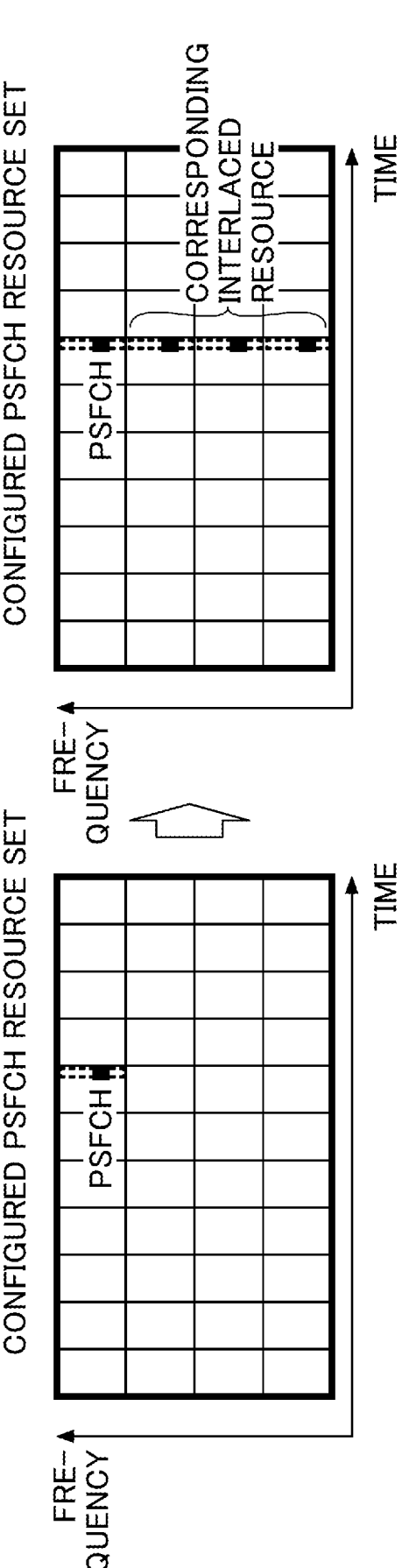
FIG. 10 is an example of feedback channel transmission in an embodiment of the present invention.

FIG. 10 is an example of feedback channel transmission in an embodiment of the present invention. In the unlicensed band, as illustrated in FIG. 10. PSFCH resources may be defined as a channel to which interlacing is applied. The interlacing may be applied to sub-channels in the resource pool, and, at the same time, the interlacing may be applied to PSFCH resources. The interlacing may be performed by using a unit including a PRB, may be performed by using a unit including a plurality of PRBs, or may be performed by using a unit including a plurality of sub-carriers.

It is to be noted that the interlacing applied to PSFCH resources may mean that the same PSFCH resource is repeatedly multiplexed in the frequency domain, or may mean that one PSFCH resource is divided into multiple resources to be multiplexed in the frequency domain, for example.

An upper limit may be configured to the frequency multiplexing number of PSFCHs, an upper limit may be configured to the number of PRBs in one PSFCH resource set illustrated in FIG. 10, or an upper limit may be configured to the interlace spacing. Different values may be configured for each SCS, and, for example, an upper limit of the interlace spacing may be 10 PRBs in a case where the SCS is 15 KHz, or may be 5 PRBs in a case where the SCS is 30 kHz. In an interlaced PSFCH transmission, the cyclic shift applied to the base sequence may be different for each frequency resource (for example, for each PRB). For example, the index of the cyclic shift may be increased by K for each frequency resource, and K may be equal to 5.

The PSFCH transmission can be also configured to satisfy the OCB requirements by applying the interlacing to PSFCH resources as described above.

Alternatively, the PSFCH resources may be defined as a channel of multiple RBs. The multiple RBs may be contiguous multiple RBs. The interlacing may be applied to sub-channels in the resource pool, and, at the same time, the PSFCH transmission with multiple RBs may be performed.

The number of RBs may be defined in the technical specification, may be configured, or may be pre-configured. The number of RBs that is equal to or greater than the number that satisfies the OCB requirements may be used. In a case where the number of RBs is N, the PSFCH resource is defined as shown below:

$$R_{PRB,cs}^{PSFCH} = N_{type}^{PSFCH} * \frac{*}{M_{subch,slot}^{PSFCH} * N_{cs}^{PSFCH} * N},$$

and a resource corresponding to an index of $$\{(P_{ID}+M_{ID}) \bmod R_{PRB,cs}^{PSFCH}\}+n$$

may be used. It is to be noted that n may be an integer from 0 to N-1. Other parameters may be the same as the parameters in the 3GPP release 16 and release 17 sidelink.

Figure 11:
FIG. 11 is a drawing illustrating an example of a sidelink SSB.

FIG. 11 is a drawing illustrating an example of a sidelink SSB. As illustrated in FIG. 11, S-SSB (Sidelink SS/PBCH Block) of 3GPP release 16 and release 17 may include 127 REs (Resource Element) of S-PSS (Sidelink Primary SS) and S-SSS (Sidelink Secondary SS), and eleven RBs of PSBCH (Physical Sidelink Broadcast Channel). With respect to PSBCH, three DM-RSs (Demodulation Reference Signal) may be arranged in one RB. There may be no signal used for switching between transmission and reception at the last symbol of S-SSB.

The amount of S-SSB frequency resources in the unlicensed band may be different from that in the conventional ITS band or licensed band.

For example, a sequence longer than 127 REs may be used as the S-PSS and S-SSS sequence. For example, the sequence may be the same as that of PRACH preamble, may be the 1151 ZC (Zadoff-Chu) sequence, and may be the 571 ZC sequence in the 30 kHz SCS, for example. For example, the sequence may be the 1151 ZC sequence in the 15 KHz SCS, and may be the 571 ZC sequence in the 30 kHz SCS. The type of sequence, for example, S-PSS M sequence or S-SSS Gold sequence, may be the same, or only the length of sequence may be changed. The sequences may be the same and may be repeated in the frequency direction, or cyclic shift may be applied to all of or a part of the sequences.

For example, the amount of PSBCH resources may be greater than 11 RBs. After the generation of 11 RBs of PSBCH, the same coded bits may be copied in the frequency direction, or the rate matching may be performed for the entire RBs to be used. The frequency spacing of the PSBCH DM-RS may be changed. The PSBCH DM-RS sequence may be copied in the frequency direction after the generation of 11 RBs of PSBCH, or may be generated based on the entire RBs to be used.

The OCB requirements can be satisfied by configuring the S-SSB as described above, PAPR (Peak to average power ratio) can be caused to be smaller, and the S-SSB detection accuracy can be improved.

In the unlicensed band, PSCCH and/or PSSCH and/or CSI-RS may be transmitted at the same time in the same time resource as S-SSB, S-SSB may be transmitted by using a slot included in the resource pool, or an S-SSB slot is not required to be excluded at the time of resource pool determination. Hereinafter, "PSCCH and/or PSSCH and/or CSI-RS" will be also referred to as "PSCCH/PSSCH/CSI-RS".

S-SSB and PSCCH/PSSCH/CSI-RS may be transmitted by using frequency multiplexing. PSCCH/PSSCH/CSI-RS may be transmitted by using a slot structure without a PSFCH resource. PSCCH/PSSCH/CSI-RS is not required to be transmitted in a sub-channel including S-SSB.

Information related to the CSI-RS time resource, frequency resource, and antenna ports may be defined in the technical specification, may be configured, or may be pre-configured.

The OCB requirements can be satisfied by configuring S-SSB as described above, the S-SSB structure is not required to be changed from the conventional structure, and the UE configuration related to S-SSB transmission and reception can be simplified.

In the unlicensed band, transmission of PSFCH and/or S-SSB is not required to be allowed. Transmission of PSFCH and/or S-SSB is not required to be changed in order to satisfy the OCB requirements, and the UE configuration can be simplified.

An operation in a case of resource allocation mode 2, that is, in a case of autonomous sidelink resource selection by the terminal 20 may be specified as a channel access operation in the unlicensed band as described below.

Figure 12:
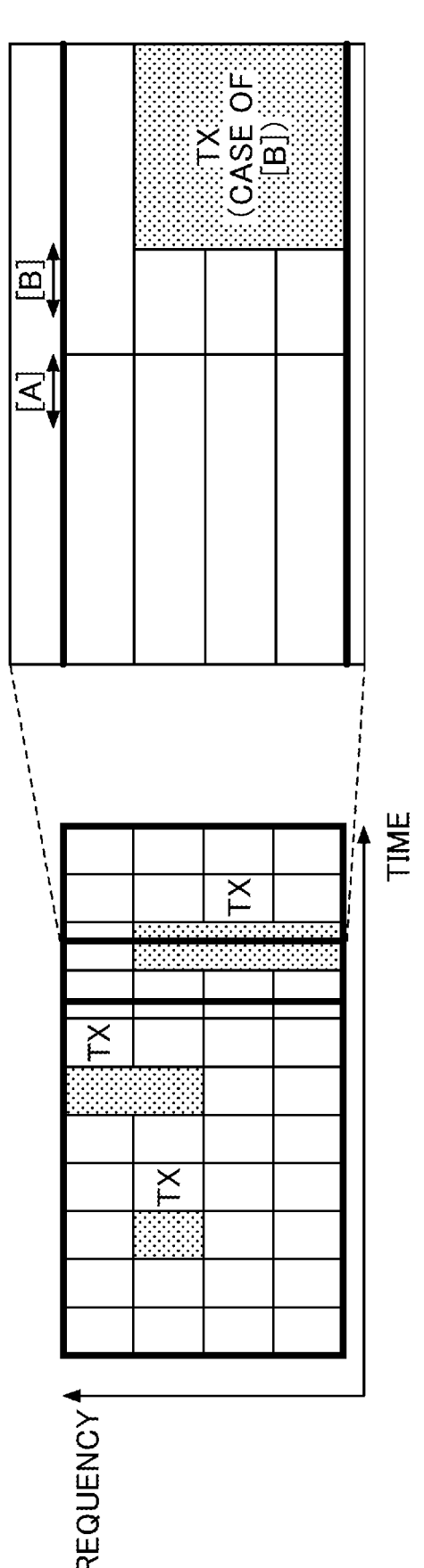
FIG. 12 is a drawing illustrating an example (1) of an LBT in an embodiment of the present invention.

FIG. 12 is a drawing illustrating an example (1) of LBT in an embodiment of the present invention. As illustrated in FIG. 12, the terminal 20 may perform an LBT before transmission of a PSCCH/PSSCH. As illustrated in [A] in FIG. 12, an LBT may be performed during the last x-us period of a symbol immediately before the PSCCH/PSSCH resource (including the data-copied symbol) to be transmitted. In a case where all of symbols in a slot can be used for sidelink, an LBT may be performed during the x-us period immediately before the first symbol of a slot.

In addition, as illustrated in [B] in FIG. 12, an LBT may be performed during the first x-us period of the first symbol of the PSCCH/PSSCH resource (data-copied symbol) to be transmitted. In a case where the terminal 20 transmits a PSCCH/PSSCH, the terminal 20 is not required to perform transmission during the first x us of a symbol of the PSCCH/PSSCH.

The x may be a fixed value, may be defined in the technical specification, may be configured, or may be pre-configured. The x may be a random value satisfying x1<=x<=x2, x1 and/or x2 may be a fixed value, may be defined in the technical specification, may be configured, or may be pre-configured. Signal transmission from another system can be detected in the unlicensed band by performing an LBT at the time of PSCCH/PSSCH transmission as described above.

The terminal 20 may perform PSCCH/PSSCH transmission after the successful LBT. In a case where power that exceeds a predetermined power value is not detected in an LBT (defined as "successful LBT"), the PSCCH/PSSCH transmission may be performed using the corresponding slot.

In a case where the resource pool extends across multiple LBT bands, the PSCCH/PSSCH transmission may be permitted only in a case where the LBT is successful in all of the multiple LBT bands, or the PSCCH/PSSCH transmission may be permitted in bands among the multiple LBT bands in which the LBT is successful.

In addition, in a case where the resource pool extends across multiple LBT bands and where the LBT is successful only in some of the multiple LBT bands, the entire transmission may be stopped, or the PSCCH/PSSCH transmission may be permitted in a sub-channel located in a band in which the LBT is successful, among the multiple LBT bands.

In a case where the terminal 20 detects power exceeding the predetermined power value in the LBT (defined as "failed LBT"), the PSCCH/PSSCH transmission using the corresponding slot is not required to be permitted.

The sidelink transmission can be performed to satisfy the channel access requirements by performing an LBT at the time of PSCCH/PSSCH transmission as described above.

In a case where the terminal 20 performs another transmission before transmission of a PSCCH/PSSCH, an LBT may be applied based on the gap between the two transmissions. The another transmission may be a transmission of one of PSCCH, PSSCH, PSFCH, or S-SSB.

In a case where the gap is equal to or less than a predetermined value y, or the gap is less than the predetermined value y, transmission may be performed without performing an LBT (the same as the type 2c UL channel access). The y may be a fixed value, may be defined in the technical specification, may be configured, or may be pre-configured. The length of the PSCCH/PSSCH transmission may be limited to a case of a predetermined value (for example, 584 μs).

Different LBT operations may be performed between a case in which the gap is equal to or less than a predetermined value z and a case in which the gap exceeds the predetermined value z. The z may be a fixed value, may be defined in the technical specification, may be configured, or may be pre-configured. In a case where the gap is equal to or less than z, an LBT may be performed as illustrated in FIG. 12 above. In a case where the gap exceeds z, an LBT may be performed as illustrated in FIG. 12 in which the random value x satisfying x1<=x<=x2 is used with respect to the x in LBT as illustrated in FIG. 12 above.

An operation related to LBT may be determined based on what the another transmission is. For example, the LBT may be performed in a case where the another transmission is a PSCCH/PSSCH transmission, and the LBT is not required to be performed in a case where the another transmission is a PSFCH transmission.

By performing an LBT based on the gap between transmissions, operations required for transmission can be reduced based on the regulations in which transmission is permitted by a simple LBT.

Figure 13:
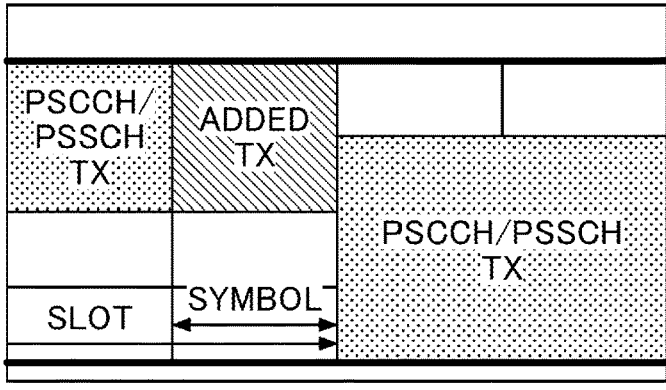
FIG. 13 is a drawing illustrating an example (3) of sidelink transmission in an embodiment of the present invention.

FIG. 13 is a drawing illustrating an example (3) of sidelink transmission in an embodiment of the present invention. As illustrated in FIG. 13, in a case where another transmission is performed before transmission of a PSCCH/PSSCH, a predetermined added transmission may be performed during a period between the two transmissions. The another transmission may be a transmission of one of PSCCH, PSSCH, PSFCH, or S-SSB. The gap between the transmission of a PSCCH/PSSCH and the another transmission may be within a predetermined period.

The resource in which the predetermined transmission is performed may be one of 1) to 4) described below.

1) At least a part of a symbol after the another transmission
2) At least a part of a symbol before the PSCCH/PSSCH transmission.
3) The time position and length that can be transmitted may be defined by the technical specification, may be configured, may be pre-configured, or may be different depending on the SCS.
4) The frequency resource may be the same as the another transmission, may be the same as the PSCCH/PSSCH, or may be different from the another transmission and the PSCCH/PSSCH.

A signal of the predetermined transmission may be one of 1) to 4) described below.

1) A signal defined for a function of performing the predetermined transmission, for example, a signal of a predetermined sequence (M sequence (low-PAPR sequence), Gold sequence (pseudo-random sequence), ZC sequence (low-PAPR sequence), or the like
2) A signal that is the same as the another transmission 3) A signal that is the same as the PSCCH/PSSCH transmission
4) Any signal Transmission power of the predetermined transmission may be one of 1) to 3) described below.

1) Transmission power that is the same as the another transmission
2) Transmission power that is the same as the PSCCH/PSSCH transmission
3) A predetermined value An LBT based on the gap between transmissions described above may be performed based on the predetermined transmission. In addition, in a case where the contiguous transmission exceeds predetermined time, the predetermined transmission is not required to be performed.

An operation in which transmissions are contiguous can be performed by performing a predetermined transmission between two transmissions, and cases in which an LBT is required can be reduced.

In a case where the terminal 20 has performed another reception before a transmission of a PSCCH/PSSCH and has successfully detected a signal (for example, PSCCH) from another terminal 20 (for example, successful decoding, that is, successful CRC check) before a predetermined timing, an LBT may be applied based on the gap between the time point of the end of the reception and the time point of the start of the transmission. The another reception may be one of PSCCH, PSSCH, PSFCH or S-SSB. In a case where the gap is equal to or less than a predetermined value y, or the gap is less than the predetermined value y, transmission may be performed without performing an LBT (the same as the type 2c UL channel access). The y may be a fixed value, may be defined in the technical specification, may be configured, or may be pre-configured. The length of the PSCCH/PSSCH transmission may be limited to a case of a predetermined value (for example, 584 ps).

Different LBT operations may be performed between a case in which the gap is equal to or less than a predetermined value z and a case in which the gap exceeds the predetermined value z. The z may be a fixed value, may be defined in the technical specification, may be configured, or may be pre-configured. In a case where the gap is equal to or less than z, an LBT may be performed as illustrated in FIG. 12 above. In a case where the gap exceeds z, an LBT may be performed as illustrated in FIG. 12 in which the random value x satisfying x1<=x<=x2 is used with respect to the x in LBT as illustrated in FIG. 12 above.

An operation related to LBT may be determined based on what the another transmission is. For example, the LBT may be performed in a case where the another transmission is a PSCCH/PSSCH transmission, and the LBT is not required to be performed in a case where the another transmission is a PSFCH transmission.

Figure 14:
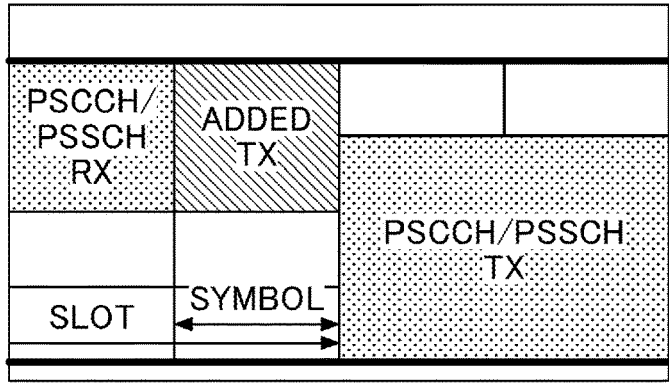
FIG. 14 is a drawing illustrating an example (4) of sidelink transmission in an embodiment of the present invention.

FIG. 14 is a drawing illustrating an example (4) of sidelink transmission in an embodiment of the present invention. As illustrated in FIG. 14, in a case where the terminal 20 has performed another reception before a transmission of a PSCCH/PSSCH and has successfully detected a signal (for example, PSCCH) from another terminal 20 (for example, successful decoding, that is, successful CRC check) before a predetermined timing, a predetermined transmission may be performed during a period from the time point of the end of the reception and the time point of the start of the transmission. The another reception may be one of PSCCH, PSSCH, PSFCH or S-SSB.

The resource in which the predetermined transmission is performed may be one of 1) to 4) described below.

1) At least a part of a symbol after the another reception
2) At least a part of a symbol before the PSCCH/PSSCH transmission.
3) The time position and length that can be transmitted may be defined by the technical specification, may be configured, may be pre-configured, or may be different depending on the SCS.
4) The frequency resource may be the same as the another reception, may be the same as the PSCCH/PSSCH, or may be different from the another reception and the PSCCH/PSSCH.

A signal of the predetermined transmission may be one of 1) to 4) described below.

1) A signal defined for a function of performing the predetermined transmission, for example, a signal of a predetermined sequence (M sequence (low-PAPR sequence), Gold sequence (pseudo-random sequence), ZC sequence (low-PAPR sequence), or the like
2) A signal that is the same as the another reception
3) A signal that is the same as the PSCCH/PSSCH transmission
4) Any signal Transmission power of the predetermined transmission may be one of 1) to 3) described below.

1) Transmission power that is the same as the another reception
2) Transmission power that is the same as the PSCCH/PSSCH transmission
3) A predetermined value An LBT based on the gap between transmission and reception described above may be performed based on the predetermined transmission. In addition, in a case where the contiguous transmission exceeds predetermined time, the predetermined transmission is not required to be performed.

The above-described operation at the time of transmission of a PSCCH/PSSCH in the resource allocation mode 2 may be applied to an operation before transmission of an S-SSB in the same way.

It is to be noted that the transmission of an S-SSB is not required to be performed in the unlicensed band. For example, the terminal 20 may establish synchronization based on a signal received from a GNSS (Global Navigation Satellite System), eNB, or gNB. For example, the terminal 20 is not required to perform a reception operation of an S-SSB. Accordingly, increased LBT operations can be avoided. In addition, the LBT may be performed before PSCCH transmission, and is not required to be associated with PSSCH transmission.

It is to be noted that the above-described operation before transmission of a PSCCH/PSSCH in the resource allocation mode 2 may be combined with one of the above-described operations for satisfying the OCB requirements, for example, the resource pool configurations, to be applied.

An operation in a case of resource allocation mode 1, that is, in a case of sidelink resource scheduling by the network may be specified as a channel access operation in the unlicensed band as described below.

After the terminal 20 receives a dynamic sidelink grant from the network, an LBT operation related to the sidelink transmission described in 1) to 3) below may be performed.

1) LBT may be performed before transmission of a PSCCH/PSSCH based on the specification. The LBT operation method may be similar to one of the above-described LBT operations in the resource allocation mode 2, or may be the same as one of the above-described LBT operations in the resource allocation mode 2.

2) LBT may be performed before transmission of a PSCCH/PSSCH, based on an indication that is related to LBT and is received from the network. A method of one of the above-described LBT operations in the resource allocation mode 2 is to be performed may be configured or indicated. In addition, transmission without power detection may be configured or indicated. In a case where a signal from another terminal 20 has not been detected in a resource immediately before the transmission (for example, decoding failure, CRC check error), an LBT method that is different from the configured or indicated LBT may be applied.

3) An LBT method to be performed before PSCCH/PSSCH transmission may be determined and performed based on whether the allocated sidelink resources are contiguous in the time direction. A corresponding PSFCH may be included in the allocated sidelink resources.

The LBT can be performed based on the sidelink scheduling by the network by performing an LBT operation in the resource allocation mode 1 as described above. In addition, an unnecessary LBT can be avoided by performing LBTs based on presence or absence of transmission in the entire sidelink terminals.

After configuration of sidelink configured grant (CG) received from the network or after the activation, LBT operations related to the sidelink transmission described in 1) to 4) below may be performed by the terminal 20.

1) LBT may be performed before transmission of a PSCCH/PSSCH based on the specification. The LBT operation method may be similar to one of the above-described LBT operations in the resource allocation mode 2, or may be the same as one of the above-described LBT operations in the resource allocation mode 2.

2) LBT may be performed before transmission of a PSCCH/PSSCH, based on an indication that is related to LBT and is received from the network. A method of one of the above-described LBT operations in the resource allocation mode 2 is to be performed may be configured or indicated. In addition, transmission without power detection may be configured or indicated. In a case where a signal from another terminal 20 has not been detected in a resource immediately before the transmission (for example, decoding failure, CRC check error), an LBT method that is different from the configured or indicated LBT may be applied. The LBT method may be provided by a CG configuration, or the LBT method may be provided in the activation command.

3) The LBT method to be performed before transmission of a PSCCH/PSSCH may be determined and performed based on whether or not the allocated sidelink resources are contiguous in the time direction. A corresponding PSFCH may be included in the allocated sidelink resources. The above-described "whether or not . . . are contiguous in the time direction" may be a condition between resources in a period of CG, may be a condition between resources in neighboring periods of CG.

4) Transmission of a transport block extending across the CG periods may be performed. With respect to the CG resources including slot n, slot n+P, slot n+2P, slot n+3P . . . the same transport block may be transmitted in slot n and slot n+P, for example. Whether or not the transport blocks are same may be indicated by a first-stage SCI via PSCCH, or may be indicated by a second-stage SCI via PSCCH.

The LBT can be performed based on the sidelink scheduling by the network by performing an LBT operation with respect to the CG of the resource allocation mode 1 as described above. In addition, an unnecessary LBT can be avoided by performing LBTs based on presence or absence of transmission in all of the sidelink terminals, CG resources can be efficiently used.

The terminal 20 may perform PSCCH/PSSCH transmission after the successful LBT. In a case where power that exceeds a predetermined power value is not detected in an LBT (defined as "successful LBT"), the PSCCH/PSSCH transmission may be performed using the corresponding slot.

In a case where the resource pool extends across multiple LBT bands, the PSCCH/PSSCH transmission may be permitted only in a case where the LBT is successful in all of the multiple LBT bands, or the PSCCH/PSSCH transmission may be permitted in bands among the multiple LBT bands in which the LBT is successful.

In addition, in a case where the resource pool extends across multiple LBT bands and where the LBT is successful only in some of the multiple LBT bands, the entire transmission may be stopped, or the PSCCH/PSSCH transmission may be permitted in a sub-channel located in a band in which the LBT is successful, among the multiple LBT bands.

In a case where the terminal 20 detects power exceeding the predetermined power value in the LBT (defined as "failed LBT"), the PSCCH/PSSCH transmission using the corresponding slot is not required to be permitted.

The sidelink transmission can be performed to satisfy the channel access requirements by performing an LBT at the time of transmission of a PSCCH/PSSCH in the resource allocation mode 1 as described above.

Figure 15:
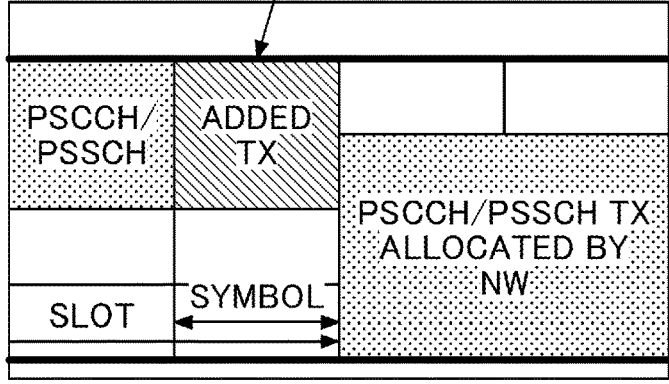
FIG. 15 is a drawing illustrating an example (5) of sidelink transmission in an embodiment of the present invention.

FIG. 15 is a drawing illustrating an example (5) of sidelink transmission in an embodiment of the present invention.

As illustrated in FIG. 15, a predetermined transmission is to be performed in a predetermined time resource before a transmission resource for a PSCCH/PSSCH allocated by the network may be configured or indicated.

Resources used for the predetermined transmission to be performed may be one of 1) to 3) described below. Information related to one of transmission operations using the resources may be indicated from the network to the terminal 20.

1) At least a part of a symbol before the PSCCH/PSSCH transmission.
2) The time position and length that can be transmitted may be defined by the technical specification, may be configured, may be pre-configured, or may be different depending on the SCS.
3) The frequency resource may be the same as the PSCCH/PSSCH, or may be different from the another transmission and the PSCCH/PSSCH.

A signal of the predetermined transmission may be one of 1) to 3) described below. Information related to one of the predetermined transmission operations may be indicated from the network to the terminal 20.

1) A signal defined for a function of performing the predetermined transmission, for example, a signal of a predetermined sequence (M sequence (low-PAPR sequence), Gold sequence (pseudo-random sequence), ZC sequence (low-PAPR sequence), or the like
2) A signal that is the same as the PSCCH/PSSCH transmission
3) Any signal Transmission power of the predetermined transmission may be one of 1) to 3) described below. Information related to one of the predetermined transmission powers may be indicated from the network to the terminal 20.

1) Transmission power that is the same as the PSCCH/PSSCH transmission
2) A predetermined value The terminal 20 may perform the predetermined transmission before the resource of the PSCCH/PSSCH that is allocated by the network, based on the above-described information. The LBT is not required to be performed before performing the predetermined transmission, or a predetermined LBT (for example, one of LBT methods in the resource allocation mode 2) may be performed.

An LBT based on the gap between transmissions described above may be performed based on the predetermined transmission. In addition, in a case where the contiguous transmission exceeds predetermined time, the predetermined transmission is not required to be performed.

The network can control transmissions to be contiguous by having a predetermined transmission be performed between two transmissions, and thus, cases in which an LBT is required can be reduced.

The terminal 20 may perform operations 1) to 2) described below when transmitting a sidelink HARQ-ACK report to the network via PUCCH.

1) In a case where all of or a part of transmissions using the sidelink resources according to the scheduled dynamic grant or CG could not be performed due to the failed LBT and where there is a PUCCH resource corresponding to the transmissions, the terminal 20 may transmit a NACK in the PUCCH or PUSCH. The priority of NACK may be the same as that of data that could not be transmitted due to the failed LBT. Information indicating that the transmission could not be performed due to the failed LBT may be transmitted instead of NACK.
2) In a case of the resource allocation mode 1 in the unlicensed band, the terminal 20 may expect that a PUCCH resource corresponding to the sidelink resource is to be provided. For example, the terminal 20 is not required to expect a sidelink grant without a PUCCH resource.

A retransmission resource can be requested at the time of failed LBT by reporting the sidelink HARQ-ACK to the network as described above.

The terminal 20 may report information related to the sidelink channel state to the network as described in 1) to 4) below.

1) The terminal 20 may report information related to the successful LBT or failed LBT to the network. The terminal 20 may report the number of successful LBTs or failed LBTs during a predetermined time period to the network. In addition, the terminal 20 may report the rate of successful LBT or failed LBT to the network.
2) The terminal 20 may report information related to the power detection value during the LBT period to the network. The power detection value may be an average value during a predetermined time period.
3) The report of information related to the sidelink channel state may be performed via one of PUCCH and PUSCH, or may be performed in one of PHY, MAC, and RRC layers.
4) Reporting of information related to the sidelink channel state or reporting contents may be configured or indicated by the network, or the terminal 20 may autonomously perform the reporting.

The network can determine the sidelink channel state by having information related to the sidelink channel state be reported to the network as described above.

An operation before a PSCCH/PSSCH transmission scheduled by the network in the resource allocation mode 1 as described above may be similarly applied to an operation before the S-SSB transmission.

It is to be noted that the transmission of an S-SSB is not required to be performed in the unlicensed band. For example, the terminal 20 may establish synchronization based on a signal received from a GNSS, eNB, or gNB. For example, the terminal 20 is not required to perform an S-SSB reception operation. Accordingly, increased LBT operations can be avoided. In addition, the LBT may be performed before PSCCH transmission, and is not required to be associated with PSSCH transmission.

It is to be noted that the above-described operation at the time of PSCCH/PSSCH transmission scheduled by the network in the resource allocation mode 1 may be combined with one of the above-described operations for satisfying the OCB requirements, for example, the resource pool configurations, to be applied.

An operation of transmitting a PSFCH after reception of a PSSCH may be specified as a channel access operation in the unlicensed band as described below.

Figure 16:
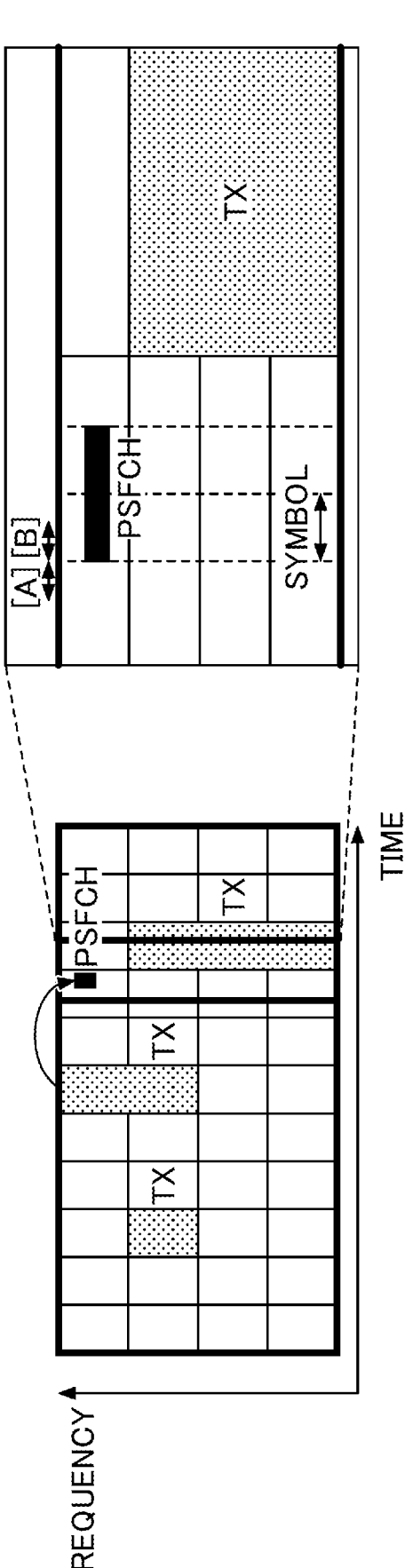
FIG. 16 is a drawing illustrating an example (1) of an LBT at the time of feedback channel transmission in an embodiment of the present invention.

FIG. 16 is a drawing illustrating an example (1) of an LBT at the time of feedback channel transmission in an embodiment of the present invention. The terminal 20 may perform an LBT before the PSFCH transmission. For example, as illustrated in [A] in FIG. 16, an LBT may be performed during a p us period at the end of a symbol immediately before the PSFCH resource (including the data-copied symbol) to be transmitted. In a case where all of symbols in a slot can be used for sidelink, an LBT may be performed during the p us period immediately before a symbol two symbols before the last symbol of a slot.

In addition, as illustrated in [B] in FIG. 16, an LBT may be performed during the first p us period of the first symbol of the PSFCH resource (data-copied symbol) to be transmitted. In a case where the terminal 20 transmits a PSFCH, the terminal 20 is not required to perform transmission during the first p ps of a symbol of the PSFCH.

The p may be a fixed value, may be defined in the technical specification, may be configured, or may be pre-configured. The p may be a random value satisfying $p1<=p<=p2$, p1 and/or p2 may be a fixed value, may be defined in the technical specification, may be configured, or may be pre-configured.

Signal transmission from another system can be detected in the unlicensed band by performing an LBT at the time of PSCCH/PSSCH transmission as described above.

The terminal 20 may perform PSFCH transmission after the successful LBT. In a case where power that exceeds a predetermined power value is not detected in an LBT (defined as "successful LBT"), the PSFCH transmission may be performed using the corresponding slot.

In a case where the resource pool extends across multiple LBT bands, the PSFCH transmission may be permitted only in a case where the LBT is successful in all of the multiple LBT bands, or the PSFCH transmission may be permitted in bands in which the LBT is successful, among the multiple LBT bands.

In addition, in a case where the resource pool extends across multiple LBT bands and where the LBT is successful only in some of the multiple LBT bands, the entire transmission may be stopped, or the PSFCH transmission may be permitted in a sub-channel located in a band in which the LBT is successful, among the multiple LBT bands.

In a case where the terminal 20 detects power exceeding the predetermined power value in the LBT (defined as "failed LBT"), the PSFCH transmission using the corresponding slot is not required to be permitted. The sidelink transmission can be performed to satisfy the channel access requirements by performing an LBT at the time of PSFCH transmission as described above.

In a case where the terminal 20 performs another transmission before transmission of a PSFCH, an LBT may be applied based on the gap between the two transmissions. The another transmission may be a transmission of one of PSCCH, PSSCH, PSFCH, or S-SSB.

In a case where the gap is equal to or less than a predetermined value q, or the gap is less than the predetermined value q, transmission may be performed without performing an LBT (the same as the type 2c UL channel access). The q may be a fixed value, may be defined in the technical specification, may be configured, or may be pre-configured. The length of the PSFCH transmission may be limited to a case of a predetermined value.

Different LBT operations may be performed between a case in which the gap is equal to or less than a predetermined value r and a case in which the gap exceeds the predetermined value r. The r may be a fixed value, may be defined in the technical specification, may be configured, or may be pre-configured. In a case where the gap is equal to or less than r, an LBT in a case where p is a fixed value as illustrated in FIG. 16 may be performed. In a case where the gap exceeds r, an LBT may be performed as illustrated in FIG. 16 in which the random value p satisfying $p1<=p<=p2$ is used with respect to the p in an LBT illustrated in the above-described FIG. 16.

An operation related to LBT may be determined based on what the another transmission is. For example, the LBT may be performed in a case where the another transmission is a PSCCH/PSSCH transmission, and the LBT is not required to be performed in a case where the another transmission is a PSFCH transmission.

By performing an LBT based on the gap between transmissions, operations required for transmission can be reduced based on the regulations in which transmission is permitted by a simple LBT.

Figure 17:
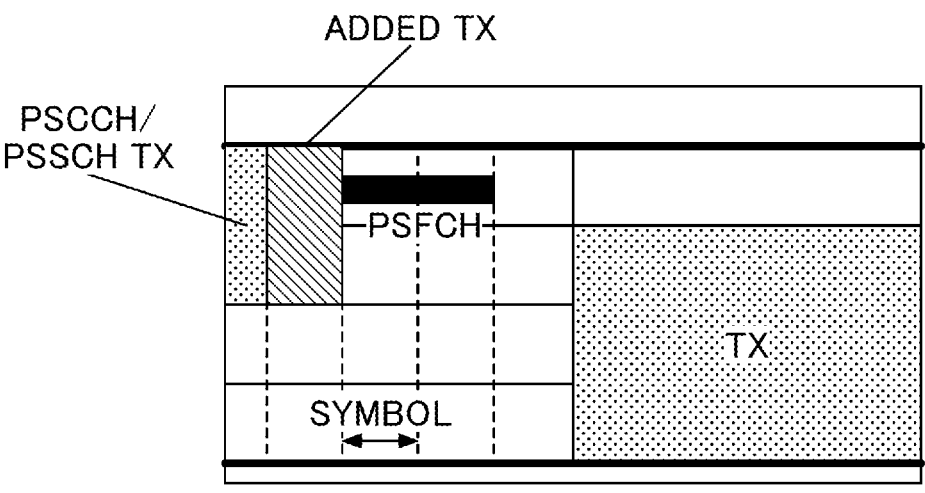
FIG. 17 is a drawing illustrating an example (6) of sidelink transmission in an embodiment of the present invention.

FIG. 17 is a drawing illustrating an example (6) of sidelink transmission in an embodiment of the present invention. As illustrated in FIG. 17, in a case where another transmission is performed before transmission of a PSFCH, a predetermined added transmission may be performed during a period between the two transmissions. The another transmission may be a transmission of one of PSCCH, PSSCH, PSFCH, or S-SSB.

The resource in which the predetermined transmission is performed may be one of 1) to 4) described below.

1) At least a part of a symbol after the another transmission

2) At least a part of a symbol before the PSFCH transmission.

3) The time position and length that can be transmitted may be defined by the technical specification, may be configured, may be pre-configured, or may be different depending on the SCS.

4) The frequency resource may be the same as the another transmission, may be the same as the PSFCH, or may be different from the another transmission and the PSFCH.

A signal of the predetermined transmission may be one of 1) to 4) described below.

1) A signal defined for a function of performing the predetermined transmission, for example, a signal of a predetermined sequence (M sequence (low-PAPR sequence), Gold sequence (pseudo-random sequence), ZC sequence (low-PAPR sequence), or the like 2) A signal that is the same as the another transmission 3) A signal that is the same as the PSFCH transmission 4) Any signal Transmission power of the predetermined transmission may be one of 1) to 3) described below.

1) Transmission power that is the same as the another transmission

2) Transmission power that is the same as the of PSFCH transmission

3) A predetermined value

An LBT based on the gap between transmissions described above may be performed based on the predetermined transmission. In addition, in a case where the contiguous transmission exceeds predetermined time, the predetermined transmission is not required to be performed.

An operation in which transmissions are contiguous can be performed by performing a predetermined transmission between two transmissions, and cases in which an LBT is required can be reduced.

In a case where the terminal 20 has performed another reception before a transmission of a PSFCH and has successfully detected a signal (for example, PSCCH) from another terminal 20 (for example, successful decoding, that is, successful CRC check) before a predetermined timing, an LBT may be applied based on the gap between the time point of the end of the reception and the time point of the start of the transmission. The another reception may be one of PSCCH, PSSCH, PSFCH or S-SSB. In a case where the gap is equal to or less than a predetermined value q, or the gap is less than the predetermined value q, transmission may be performed without performing an LBT (the same as the type 2c UL channel access). The q may be a fixed value, may be defined in the technical specification, may be configured, or may be pre-configured. The length of the PSFCH transmission may be limited to a case of a predetermined value.

Different LBT operations may be performed between a case in which the gap is equal to or less than a predetermined value r and a case in which the gap exceeds the predetermined value r. The r may be a fixed value, may be defined in the technical specification, may be configured, or may be pre-configured. In a case where the gap is equal to or less than r, an LBT in a case where p is a fixed value as illustrated in FIG. 16 may be performed. In a case where the gap exceeds r, an LBT may be performed as illustrated in FIG. 16 in which the random value p satisfying p1<=p<=p2 is used with respect to the p in an LBT illustrated in the above-described FIG. 16.

An operation related to LBT may be determined based on what the another reception is. For example, the LBT may be performed in a case where the another reception is a PSCCH/PSSCH transmission, the LBT is not required to be performed in a case where the another reception is a PSFCH.

In a case where another reception is performed before transmission of a PSFCH, the terminal 20 may perform transmission of a predetermined added transmission during a period between the time point of the end of the reception and the time point of the start of the transmission. The another reception may be one of PSCCH, PSSCH, PSFCH or S-SSB.

The resource in which the predetermined transmission is performed may be one of 1) to 4) described below.

1) At least a part of a symbol after the another reception

2) At least a part of a symbol before the PSFCH transmission.

3) The time position and length that can be transmitted may be defined by the technical specification, may be configured, may be pre-configured, or may be different depending on the SCS.

4) The frequency resource may be the same as the another reception, may be the same as the PSFCH, or may be different from the another reception and the PSFCH.

A signal of the predetermined transmission may be one of 1) to 4) described below.

1) A signal defined for a function of performing the predetermined transmission, for example, a signal of a predetermined sequence (M sequence (low-PAPR sequence), Gold sequence (pseudo-random sequence), ZC sequence (low-PAPR sequence), or the like 2) A signal that is the same as the another reception 3) A signal that is the same as the PSFCH transmission 4) Any signal Transmission power of the predetermined transmission may be one of 1) to 3) described below.

1) Transmission power that is the same as the another reception

2) Transmission power that is the same as the of PSFCH transmission

3) A predetermined value

An LBT based on the gap between transmission and reception described above may be performed based on the predetermined transmission. In addition, in a case where the contiguous transmission exceeds predetermined time, the predetermined transmission is not required to be performed.

The terminal 20 may transmit a PSFCH after the PSSCH reception without power detection or LBT. The terminal 20 that transmits a PSCCH/PSSCH corresponding to the PSFCH may be expected to perform another PSCCH/PSSCH transmission using a resource immediately before the PSFCH. The another PSCCH/PSSCH transmission may be transmission of the same transport block, or may be transmission of another transport block. According to the above-described operation, an unnecessary LBT can be skipped for transmitting a PSFCH.

Figure 18:
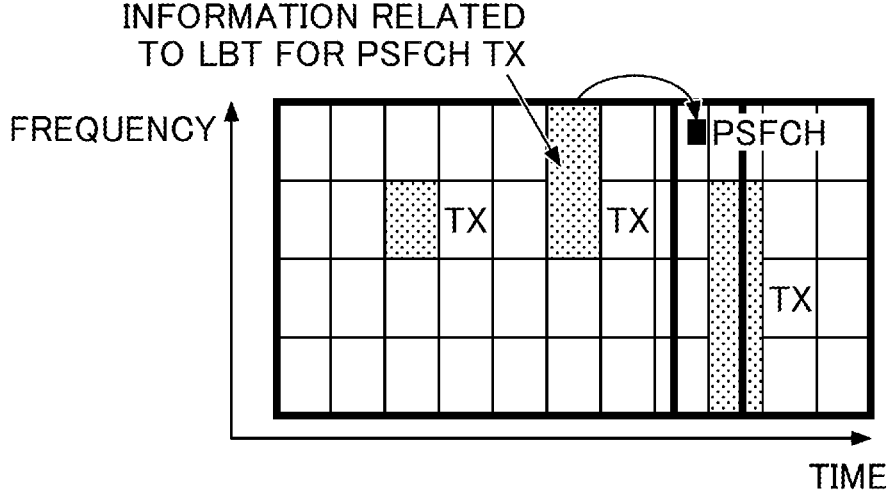
FIG. 18 is a drawing illustrating an example (2) of an LBT at the time of feedback channel transmission in an embodiment of the present invention.

FIG. 18 is a drawing illustrating an example (2) of an LBT at the time of feedback channel transmission in an embodiment of the present invention. As illustrated in FIG. 18, an LBT may be performed before a PSFCH transmission, based on an indication related to an LBT for the PSFCH transmission, received via a PSCCH/PSSCH corresponding to the PSFCH.

With respect to the indication related to an LBT for the PSFCH transmission, which of the operations related to the PSFCH transmission is to be applied may be indicated. In a case where a signal from another terminal 20 has not been detected in a resource immediately before the transmission (for example, decoding failure, CRC check error), or in a case where a predetermined condition (for example, a condition with respect to the operation related to the above-described PSFCH transmission) is satisfied, an LBT method that is different from an LBT indicated by the indication may be applied. The indication may be indicated by the first-stage SCI via PSCCH, or may be indicated by the second-stage SCI via PSCCH.

The terminal 20 that transmits a PSCCH/PSSCH corresponding to a PSFCH may indicate information related to an LBT required for the PSFCH transmission to a terminal 20 that transmits the PSFCH. The terminal 20 that transmits the PSCCH/PSSCH may determine the information to be indicated, based on which of the above-described conditions in the operation related to the PSFCH transmission is satisfied by the terminal 20 that transmits the PSFCH. For example, in a case where a terminal 20 that transmits a PSCCH/PSSCH may indicate, to a terminal 20 that transmits a PSFCH, that the PSFCH is to be transmitted without an LBT in a case where another PSCCH/PSSCH transmission is performed using a resource immediately before the PSFCH.

By means of transmitting a PSFCH after the PSSCH reception as described above, an LBT can be performed without an unnecessary LBT or without a deficiency of LBT, based on information stored by the terminal 20 that transmits the corresponding PSCCH/PSSCH.

The terminal 20 may have limitations related to the PSFCH transmission request as described in 1) to 4) below in the unlicensed band. It is to be noted that, in the groupcast option 1, only NACK is transmitted as a HARQ response, and ACK is not transmitted. In the groupcast option 2, ACK or NACK is transmitted as a HARQ response.

1) Groupcast option 2 is not required to be used. Simultaneous transmission of PSFCHs can be avoided, and a case of excessively influencing another system can be avoided.

2) An upper limit value may be configured with respect to the number of UEs that perform reception in the groupcast option 2. Limitation may be applied to the number of simultaneous PSFCH transmissions, and thus, a case of excessively influencing another system can be avoided.

3) Groupcast option 1 is not required to be used. An excessively increased power for a resource can be avoided.

4) There may be multiple associated resources as PSFCH resources corresponding to a PSCCH/PSSCH in a groupcast option 1. For example, a PSFCH resource ID may be provided according to a method described below.

$$(P_{ID}+M_{ID}) \bmod R_{PRB,cs}^{PSFCH}$$

The $P_{ID}$ is a physical layer resource ID provided by a PSSCH scheduling SCI. The $M_{ID}$ is an identifier indicated by a higher layer of a UE that receives the PSSCH in a case where a detected cast type indicator is "01", and may be 0 in a case where there is no detection. The $R_{PRB,cs}^{PSFCH}$ is the number of PSFCH resources that can be used for HARQ-ACK multiplexing in the PSFCH transmission. For example, a method of determining the $M_{ID}$ may be determined as described below. The example, the $M_{ID}$ may be configured or pre-configured. For example, the $M_{ID}$ may be randomly determined from a predetermined value range. For example, the $M_{ID}$ may be determined from a predetermined value range, based on an identifier in the physical layer or higher layer of the device itself. For example, the $M_{ID}$ may be determined in the same way as in a case where the case type indicator is detected to be "01".

Sidelink transmission related to the groupcast can be performed to satisfy the regulations of the unlicensed band by providing the limitation related to the PSFCH transmission request as described above.

It is to be noted that the above-described operation at the time of PSFCH transmission may be combined with one of the above-described operations for satisfying the OCB requirements, for example, the resource pool configurations, to be applied.

The above embodiments may be applied to an operation in which one terminal 20 configures or allocates transmission resources of another terminal 20. The above embodiments need not be limited to V2X terminals, but may be applied to terminals performing D2D communication.

According to the above-described embodiments, the resource pool can be configured to satisfy the regulations in the unlicensed band. In addition, the terminal 20 can perform PSCCH/PSSCH transmission in the resource allocation mode 2 to satisfy regulations in the unlicensed band. In addition, the terminal 20 can perform PSCCH/PSSCH transmission in the resource allocation mode 1 to satisfy regulations in the unlicensed band. In addition, the terminal 20 can perform PSFCH transmission to satisfy regulations in the unlicensed band.

In other words, the device-to-device direct communication can be performed to satisfy the specifications in the unlicensed band.

(Device Configuration)

Next, a functional configuration example of the base station 10 and the terminal 20 for performing the processes and operations described above will be described. The base station 10 and terminal 20 include functions for implementing the embodiments described above. It should be noted, however, that each of the base stations 10 and the terminal 20 may include only some of the functions in an embodiment.

<Base Station 10>

Figure 19:
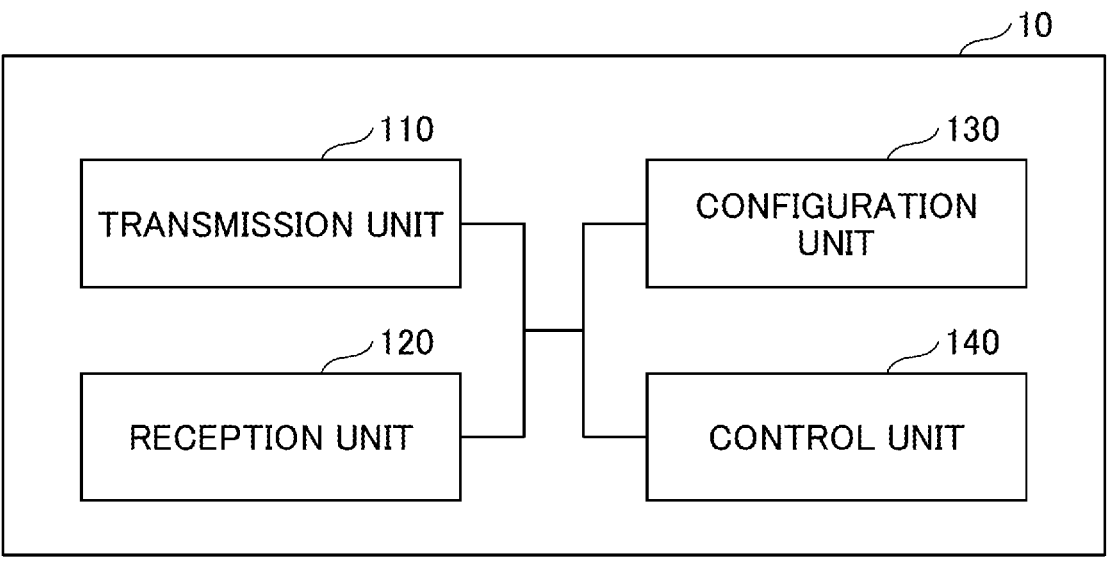
FIG. 19 is a drawing illustrating an example of a functional configuration of a base station 10 in an embodiment of the present invention.

FIG. 19 is a diagram illustrating an example of a functional configuration of the base station 10. As shown in FIG. 19, the base station 10 includes a transmission unit 110, a reception unit 120, a configuration unit 130, and a control unit 140. The functional configuration illustrated in FIG. 19 is merely an example. Functional divisions and names of functional units may be anything as long as operations according to an embodiment of the present invention can be performed. The transmission unit 110 includes a function for generating a signal to be transmitted to the terminal 20 side and transmitting the signal wirelessly. The reception unit 120 includes a function for receiving various signals transmitted from the terminal 20 and acquiring, for example, information of a higher layer from the received signals. Further, the transmission unit 110 has a function to transmit NR-PSS, NR-SSS, NR-PBCH, DL/UL control signals, DL reference signals, and the like to the terminal 20.

The configuration unit 130 stores preset configuration information and various configuration information items to be transmitted to the terminal 20 in a storage apparatus and reads the preset configuration information from the storage apparatus as necessary. Contents of the configuration information are, for example, information related to configuration of D2D communication, etc.

As described in an embodiment, the control unit 140 performs processing related to the configuration in which the terminal 20 performs D2D communication. Further, the control unit 140 transmits scheduling of D2D communication and DL communication to the terminal 20 through the transmission unit 110. Further, the control unit 140 receives information related to the HARQ response of the D2D communication and the DL communication from the terminal 20 via the reception unit 120. The functional units related to signal transmission in the control unit 140 may be included in the transmission unit 110, and the functional units related to signal reception in the control unit 140 may be included in the reception unit 120.

<Terminal 20>

Figure 20:
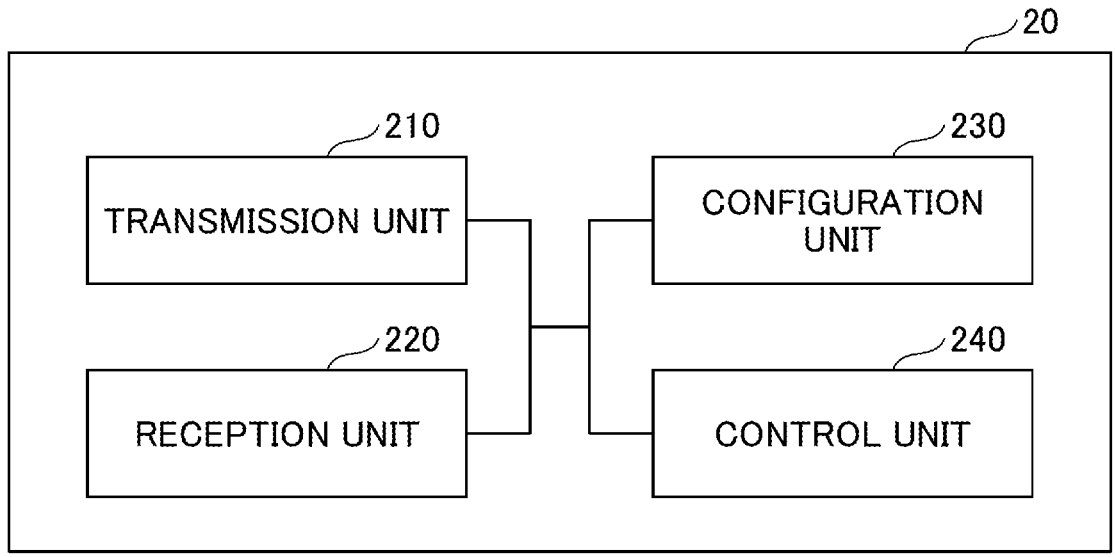
FIG. 20 is a drawing illustrating an example of a functional structure of a terminal 20 in an embodiment of the present invention.

FIG. 20 is a diagram illustrating an example of a functional configuration of the terminal 20. As shown in FIG. 20, the terminal 20 includes a transmission unit 210, a reception unit 220, a configuration unit 230, and a control unit 240. The functional configuration illustrated in FIG. 20 is merely an example. Functional divisions and names of functional units may be anything as long as operations according to an embodiment of the present invention can be performed.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL/SL control signals, or reference signals transmitted from the base station 10. Further, for example, with respect to the D2D communications, the transmission unit 210 transmits, to another terminal 20, PSCCH (Physical Sidelink Control Channel), PSSCH (Physical Sidelink Shared Channel), PSDCH (Physical Sidelink Discovery Channel), PSBCH (Physical Sidelink Broadcast Channel), etc., and the reception unit 220 receives, from the another terminal 20, PSCCH, PSSCH, PSDCH, PSBCH, etc.

The configuration unit 230 stores various configuration information received from the base station 10 or the terminal 20 by the receiving unit 220 in the storage apparatus and reads them from the storage apparatus as necessary. In addition, the configuration unit 230 also stores pre-configured configuration information. Contents of the configuration information are, for example, information related to configuration of D2D communication, etc.

The control unit 240 controls D2D communication for establishing RRC connection with another terminal 20 as described in an embodiment of the present invention. Further, the control unit 240 performs processing related to the power-saving operation. Further, the control unit 240 performs HARQ related processing of the D2D communication and DL communication. Further, the control unit 240 transmits, to the base station 10, information related to the HARQ response of the D2D communication to the other terminal 20 and the DL communication scheduled by the base station 10. Further, the control unit 240 may perform scheduling of D2D communication for another terminal 20. In addition, the control unit 240 may autonomously select a resource to be used for D2D communication from the resource selection window, based on the sensing result, or may perform reevaluation or preemption. Further, the control unit 240 performs processing related to power saving in transmission and reception of D2D communications. In addition, the control unit 240 performs processing related to inter-terminal coordination in D2D communication. The functional units related to signal transmission in the control unit 240 may be included in the transmission unit 210, and the functional units related to signal reception in the control unit 240 may be included in the reception unit 220.

(Hardware Structure)

In the above block diagrams used for describing an embodiment of the present invention (FIG. 19 and FIG. 20), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming: broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 21:
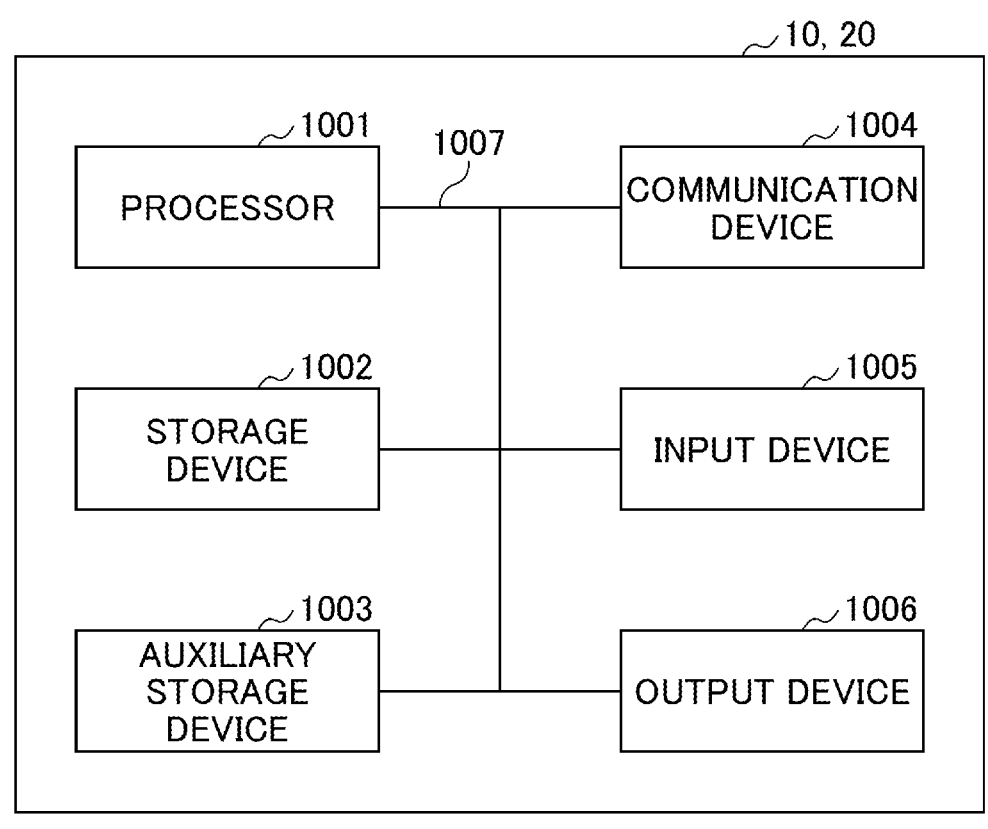
FIG. 21 is a drawing illustrating an example of a hardware structure of the base station 10 or the terminal 20 in an embodiment of the present invention.

For example, the base station 10, terminal 20, etc., according to an embodiment of the present disclosure may function as a computer for processing the radio communication method of the present disclosure. FIG. 21 is a drawing illustrating an example of hardware structures of the base station 10 and terminal 20 according to an embodiment of the present invention. Each of the above-described base station 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station 10 and terminal 20 may include one or more of each of the devices illustrated in the figure, or may be configured without including some of the devices.

Each function in the base station 10 and terminal 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads out onto the storage device 1002 a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 140 of the base station 10 illustrated in FIG. 19 may be realized by control programs that are stored in the storage device 1002 and are executed by the processor 1001. Further, for example, the control unit 240 of the terminal 20 illustrated in FIG. 20 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disc, digital versatile disc, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission or reception device) for communicating with computers via at least one of a wired network and a wireless network, and may be referred to as a network device, a network controller, a network card, a communication module, etc. The communication device 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station 10 and terminal 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Figure 22:
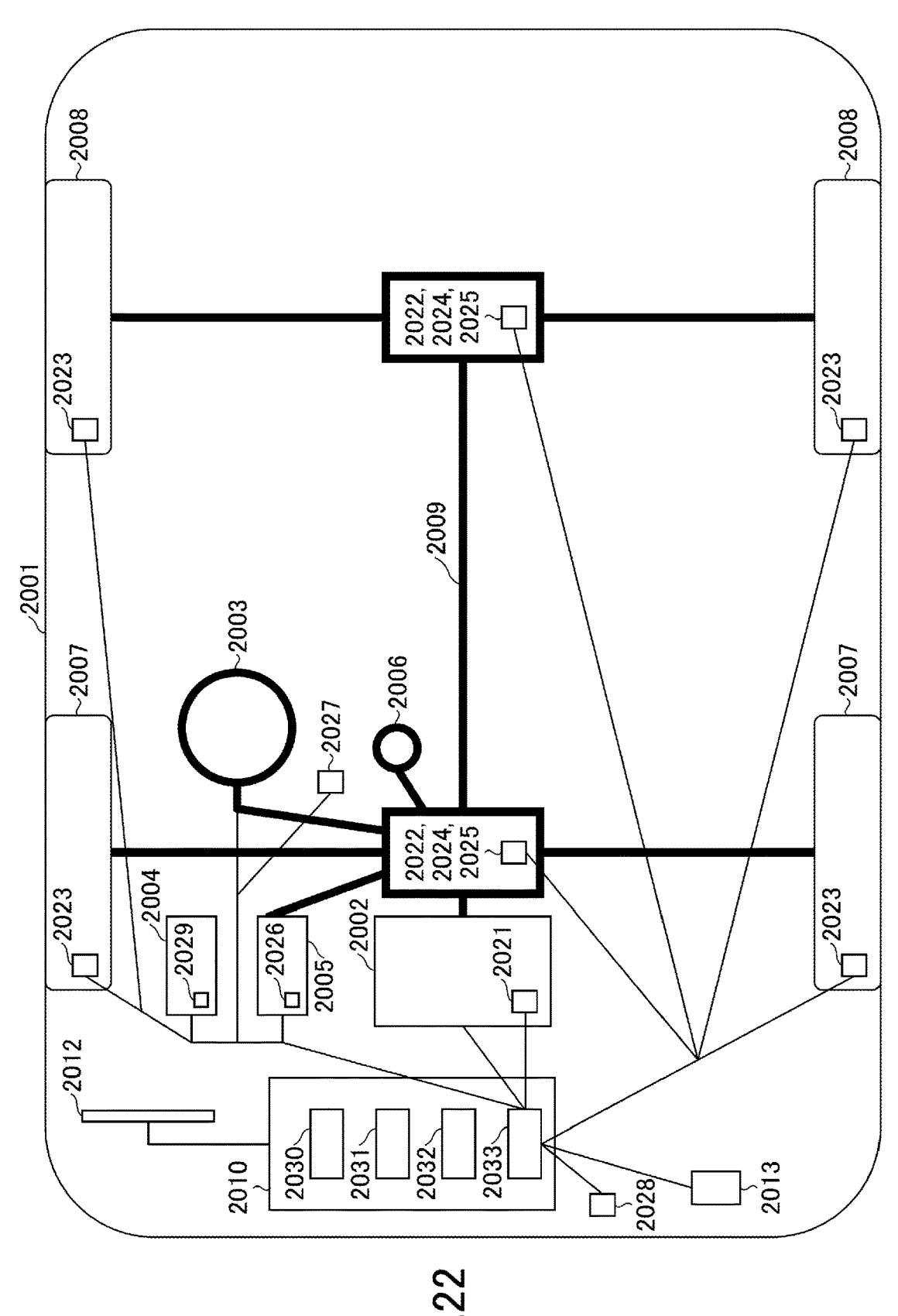
FIG. 22 is a drawing illustrating an example of a structure of a vehicle 2001 in an embodiment of the present invention.

FIG. 22 shows an example of a configuration of a vehicle 2001. As shown in FIG. 22, the vehicle 2001 includes a drive unit 2002, a steering unit 2003, an accelerator pedal 2004, a brake pedal 2005, a shift lever 2006, a front wheel 2007, a rear wheel 2008, an axle 2009, an electronic control unit 2010, various sensors 2021-2029, an information service unit 2012, and a communication module 2013. The aspects/embodiments described in the present disclosure may be applied to a communication device mounted in the vehicle 2001, and may be applied to, for example, the communication module 2013.

The drive unit 2002 may include, for example, an engine, a motor, and a hybrid of an engine and a motor. The steering unit 2003 includes at least a steering wheel and is configured to steer at least one of the front wheel and the rear wheel, based on the operation of the steering wheel operated by the user. The electronic control unit 2010 includes a microprocessor 2031, a memory (ROM, RAM) 2032, and a communication port (IO port) 2033. The electronic control unit 2010 receives signals from the various sensors 2021-2029 provided in the vehicle 2001. The electronic control unit 2010 may be referred to as an ECU (Electronic control unit).

The signals from the various sensors 2021 to 2029 include a current signal from a current sensor 2021 which senses the current of the motor, a front or rear wheel rotation signal acquired by a revolution sensor 2022, a front or rear wheel pneumatic signal acquired by a pneumatic sensor 2023, a vehicle speed signal acquired by a vehicle speed sensor 2024, an acceleration signal acquired by an acceleration sensor 2025, a stepped-on accelerator pedal signal acquired by an accelerator pedal sensor 2029, a stepped-on brake pedal signal acquired by a brake pedal sensor 2026, an operation signal of a shift lever acquired by a shift lever sensor 2027, and a detection signal, acquired by the object detection sensor 2028, for detecting an obstacle, a vehicle, a pedestrian, and the like.

The information service unit 2012 includes various devices for providing various kinds of information such as driving information, traffic information, and entertainment information, including a car navigation system, an audio system, a speaker, a television, and a radio, and one or more ECUs controlling these devices. The information service unit 2012 provides various types of multimedia information and multimedia services to the occupants of the vehicle 2001 by using information obtained from the external device through the communication module 2013 or the like.

A driving support system unit 2030 includes: various devices for providing functions of preventing accidents and reducing driver's operating loads such as a millimeter wave radar, a LIDAR (Light Detection and Ranging), a camera, a positioning locator (e.g., GNSS, etc.), map information (e.g., high definition (HD) map, autonomous vehicle (AV) map, etc.), a gyro system (e.g., IMU (Inertial Measurement Unit), INS (Inertial Navigation System), etc.), an AI (Artificial Intelligence) chip, an AI processor: and one or more ECUs controlling these devices. In addition, the driving support system unit 2030 transmits and receives various types of information via the communication module 2013 to realize a driving support function or an autonomous driving function.

The communication module 2013 may communicate with the microprocessor 2031 and components of the vehicle 2001 via a communication port. For example, the communication module 2013 transmits and receives data via a communication port 2033, to and from the drive unit 2002, the steering unit 2003, the accelerator pedal 2004, the brake pedal 2005, the shift lever 2006, the front wheel 2007, the rear wheel 2008, the axle 2009, the microprocessor 2031 and the memory (ROM, RAM) 2032 in the electronic control unit 2010, and sensors 2021-29 provided in the vehicle 2001.

The communication module 2013 is a communication device that can be controlled by the microprocessor 2031 of the electronic control unit 2010 and that is capable of communicating with external devices. For example, various kinds of information are transmitted to and received from external devices through radio communication. The communication module 2013 may be internal to or external to the electronic control unit 2010. The external devices may include, for example, a base station, a mobile station, or the like.

The communication module 2013 transmits a current signal, which is input to the electronic control unit 2010 from the current sensor, to the external devices through radio communication. In addition, the communication module 2013 also transmits, to the external devices through radio communication, the front or rear wheel rotation signal acquired by the revolution sensor 2022, the front or rear wheel pneumatic signal acquired by the pneumatic sensor 2023, the vehicle speed signal acquired by the vehicle speed sensor 2024, the acceleration signal acquired by the acceleration sensor 2025, the stepped-on accelerator pedal signal acquired by the accelerator pedal sensor 2029, the stepped-on brake pedal signal acquired by the brake pedal sensor 2026, the operation signal of the shift lever acquired by the shift lever sensor 2027, and the detection signal, acquired by the object detection sensor 2028, for detecting an obstacle, a vehicle, a pedestrian, and the like, that are input to the electronic control unit 2010.

The communication module 2013 receives various types of information (traffic information, signal information, inter-vehicle information, etc.) transmitted from the external devices and displays the received information on the information service unit 2012 provided in the vehicle 2001. In addition, the communication module 2013 stores the various types of information received from the external devices in the memory 2032 available to the microprocessor 2031. Based on the information stored in the memory 2032, the microprocessor 2031 may control the drive unit 2002, the steering unit 2003, the accelerator pedal 2004, the brake pedal 2005, the shift lever 2006, the front wheel 2007, the rear wheel 2008, the axle 2009, the sensors 2021-2029, etc., mounted in vehicle 2001.

(Embodiment Summary)

As described above, according to an embodiment of the present invention, a terminal is provided. The terminal includes: a reception unit configured to receive a control channel and a shared channel in an unlicensed band from another terminal: a control unit configured to perform an LBT (Listen before talk) for a period in a symbol immediately before a resource of a feedback channel corresponding to the shared channel or in a first symbol of the resource of the feedback channel; and a transmission unit configured to transmit a feedback to the another terminal in the resource of the feedback channel in a case where a power exceeding a threshold value is not detected in the LBT.

According to the above-described configuration, the terminal 20 can perform PSFCH transmission to satisfy the regulations in the unlicensed band. In other words, the device-to-device direct communication can be performed to satisfy the specifications in the unlicensed band.

In a case where another transmission has been performed before a transmission of the feedback channel, the control unit may transmit the feedback channel without performing the LBT in a case where a gap between the another transmission and the transmission of the feedback channel is less than a threshold value. According to the above-described configuration, the PSFCH transmission can be performed in the unlicensed band.

In a case where another transmission has been performed before a transmission of the feedback channel, the control unit may perform a transmission during a period from the another transmission to the transmission of the feedback channel. According to the above-described configuration, the PSFCH transmission can be efficiently performed in the unlicensed band.

The control unit may perform the LBT, based on a configuration related to the LBT for the feedback channel included in the control channel or the shared channel. According to the above-described configuration, the PSFCH transmission can be efficiently performed in the unlicensed band.

The control unit is not required to transmit the feedback channel in a case where the control channel or the shared channel is a groupcast option 2. According to the above-described configuration, the PSFCH transmission in the resource allocation mode 1 can be efficiently performed in the unlicensed band.

In addition, according to an embodiment of the present invention, a communication method performed by a terminal is provided. The communication method includes: receiving a control channel and a shared channel in an unlicensed band from another terminal; performing an LBT (Listen before talk) for a period in a symbol immediately before a resource of a feedback channel corresponding to the shared channel or in a first symbol of the resource of the feedback channel; and transmitting a feedback to the another terminal in the resource of the feedback channel in a case where a power exceeding a threshold value is not detected in the LBT.

According to the above-described configuration, the terminal 20 can perform PSFCH transmission to satisfy the regulations in the unlicensed band. In other words, the device-to-device direct communication can be performed to satisfy the specifications in the unlicensed band.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station 10 and the terminal 20 have been described by using functional block diagrams. However, the apparatuses may be realized by hardware, software, or a combination of hardware and software. The software executed by a processor included in the base station 10 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication may be performed not only by methods described in an aspect/embodiment of the present specification but also a method other than those described in an aspect/embodiment of the present specification. For example, the information indication may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB(Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), 6th generation mobile communication system (6G), xth generation mobile communication system (xG) (xG(x is, for example, an integer, decimal)), FRA (Future Radio Access), NR (new Radio), New radio access (NX). Future generation radio access (FX), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced, modified, developed, or defined therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station 10 in the present specification, may be performed by an upper node in some cases. In a network including one or more network nodes including the base station 10, it is apparent that various operations performed for communicating with the terminal 20 may be performed by the base station 10 and/or another network node other than the base station 10 (for example, but not limited to, MME or S-GW). According to the above, a case is described in which there is a single network node other than the base station 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus. A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may be represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple terminals 20 (e.g., may be referred to as D2D (Device-to-Device), V2X (Vehicle-to-Everything), etc.). In this case, the function of the base station 10 described above may be provided by the terminal 20. Further, the phrases "up" and "down" may also be replaced by the phrases corresponding to terminal-to-terminal communication (e.g., "side"). For example, an uplink channel, a downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The terms "determination" and "decision" may include "determination" and "decision" made with judging, calculating, computing, processing, deriving, investigating, searching (looking up, search, inquiry) (e.g., search in a table, a database, or another data structure), or ascertaining. Further, the "determining" may include "determining" made with receiving (e.g., receiving information), transmitting (e.g., transmitting information), inputting, outputting, or accessing (e.g., accessing data in a memory). Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming", "expecting", or "considering", etc.

The term "connected" or "coupled" or any variation thereof means any direct or indirect connection or connec-tion between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "based on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts", "circuits", "devices", etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission or reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot, PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled. A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.) may be replaced with a TTI having a time length exceeding 1 ms, and the short TTI (e.g., shortened TTI, etc.) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in an RB may be the same, regardless of the numerology, and may be 12, for example. The number of subcarriers included in an RB may be determined on the basis of numerology.

Further, the time domain of an RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), subcarrier groups (SCGs), resource element groups (REGs), PRB pairs, RB pairs, and the like.

Further, a resource block may include one or more resource elements (RE). For example, 1 RE may be a radio resource area of one sub-carrier and one symbol. The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a terminal 20, one or more BWPs may be configured in one carrier.

At least one of the configured BWPs may be activated, and the terminal 20 may assume that the terminal 20 will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in an RB, the number of symbols in a TTI, the symbol length, the cyclic prefix (CP) length, and the like, may be changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

Each aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE NUMERALS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Storage device
1003 Auxiliary storage device
1004 Communication device
1005 Input device
1006 Output device 2001 Vehicle
2002 Drive unit
2003 Steering unit
2004 Accelerator pedal
2005 Brake pedal
2006 Shift lever
2007 Front wheel
2008 Rear wheel
2009 Axle
2010 Electronic control unit
2012 Information service unit
2013 Communication module
2021 Current sensor
2022 Revolution sensor
2023 Pneumatic sensor
2024 Vehicle speed sensor
2025 Acceleration sensor
2026 Brake pedal sensor
2027 Shift lever sensor
2028 Object detection sensor
2029 Accelerator pedal sensor
2030 Driving support system unit
2031 Microprocessor
2032 Memory (ROM, RAM)
2033 Communication port (10 port)

The invention claimed is:

1. A terminal comprising:
a receiver configured to receive, from another terminal, a control channel and a shared channel in a resource pool in a frequency band in which Listen Before Talk (LBT) is performed in channel access;

a processor configured to perform LBT in each of a plurality of bands before transmitting a feedback channel corresponding to the shared channel; and
a transmitter configured to transmit the feedback channel in a band in which LBT is successful among the plurality of bands,
wherein the processor performs LBT, prior to transmission of the feedback channel, during a time period determined based on an indication related to LBT that is indicated via the control channel and the shared channel corresponding to the feedback channel.

2. The terminal as claimed in claim 1, wherein the transmitter transmits the feedback channel to the another terminal in a case where LBT is successful in all of the plurality of bands.

3. A communication method performed by a terminal, the communication method comprising:
receiving, from another terminal, a control channel and a shared channel in a resource pool in a frequency band in which Listen Before Talk (LBT) is performed in channel access;
performing LBT in each of a plurality of bands before transmitting a feedback channel corresponding to the shared channel; and
transmitting the feedback channel in a band in which LBT is successful among the plurality of bands,
wherein the terminal performs LBT, prior to transmission of the feedback channel, during a time period determined based on an indication related to LBT that is indicated via the control channel and the shared channel corresponding to the feedback channel.

* * * * *